United States Patent [19]

Aihara et al.

[11] Patent Number: 4,941,010
[45] Date of Patent: Jul. 10, 1990

[54] CAMERA

[75] Inventors: Yoshihiko Aihara; Masayuki Suzuki, both of Kanagawa, Japan

[73] Assignee: Canon Kabushiki Kaisha, Tokyo, Japan

[21] Appl. No.: 415,067

[22] Filed: Sep. 29, 1989

[30] Foreign Application Priority Data

Oct. 4, 1988 [JP] Japan .................................. 63-251460

[51] Int. Cl.⁵ ................................................ G03B 3/00
[52] U.S. Cl. .................................... 354/407; 354/479; 354/152
[58] Field of Search ............... 354/407, 408, 404, 405, 354/406, 402, 446, 451, 452, 453, 448, 271.1, 270, 421, 272, 479, 152

[56] References Cited

U.S. PATENT DOCUMENTS 4,492,453 1/1985 Hiramatsu ........................... 354/479
4,692,010 9/1987 Kataoka et al. .................... 354/453

Primary Examiner—L. T. Hix
Assistant Examiner—David M. Gray
Attorney, Agent, or Firm—Robin, Blecker, Daley & Driscoll

[57] ABSTRACT

A single-lens reflex camera having an automatic focusing capability, comprising a half-reflection mirror arranged in fixed relation to split part of light entering through the photographic lens to the finder optical system, a flippable submirror of total reflection arranged behind the mirror upon erection to direct part of the passed light to means for detecting the image sharpness, and control means responsive to termination of an operation of the detecting means for adjusting the size of opening of the diaphragm aperture and, at the same time, moving the submirror out of the path of the light from the mirror to the film gate, regardless of whether or not a shutter release is actuated.

21 Claims, 20 Drawing Sheets

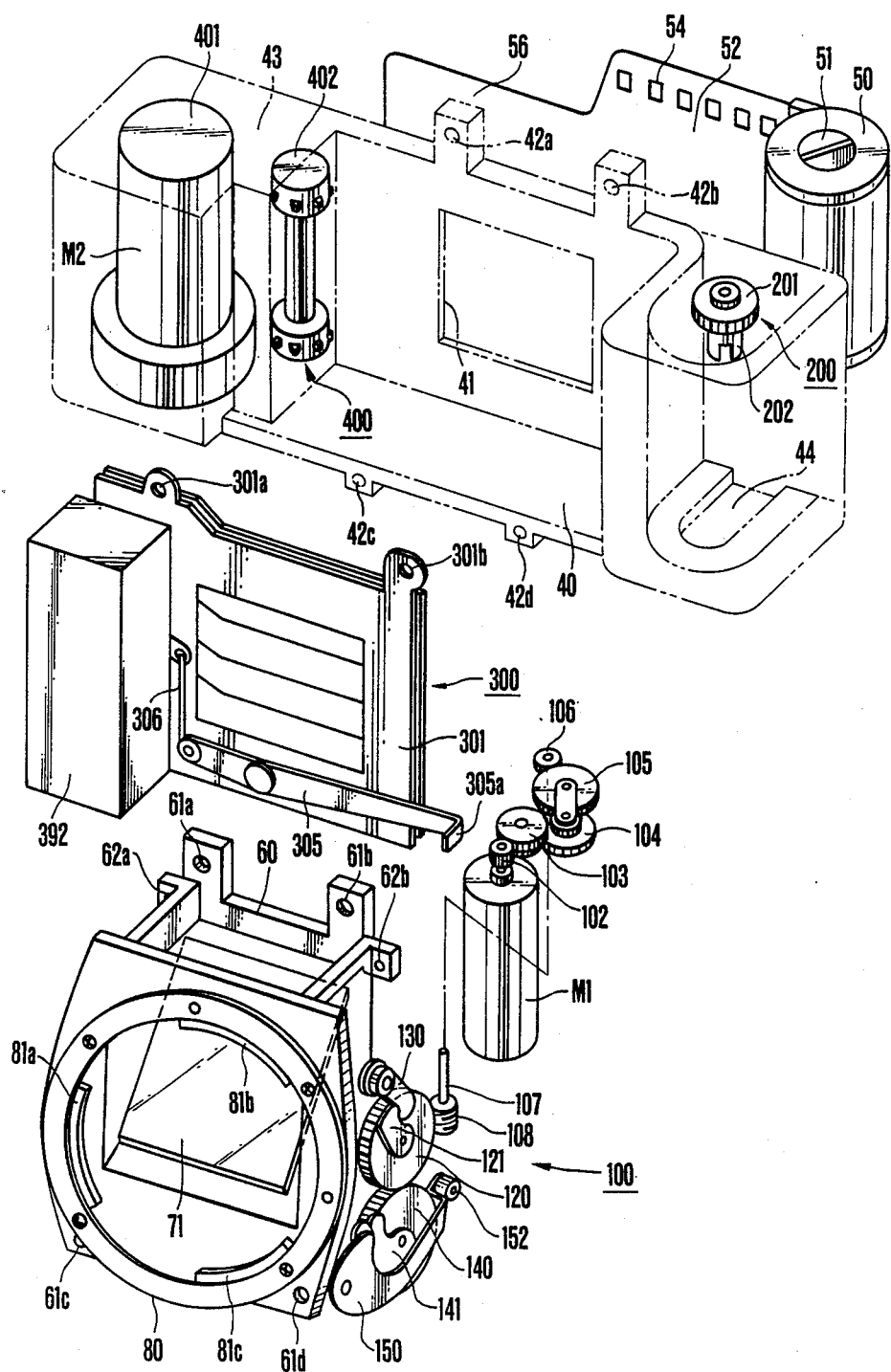

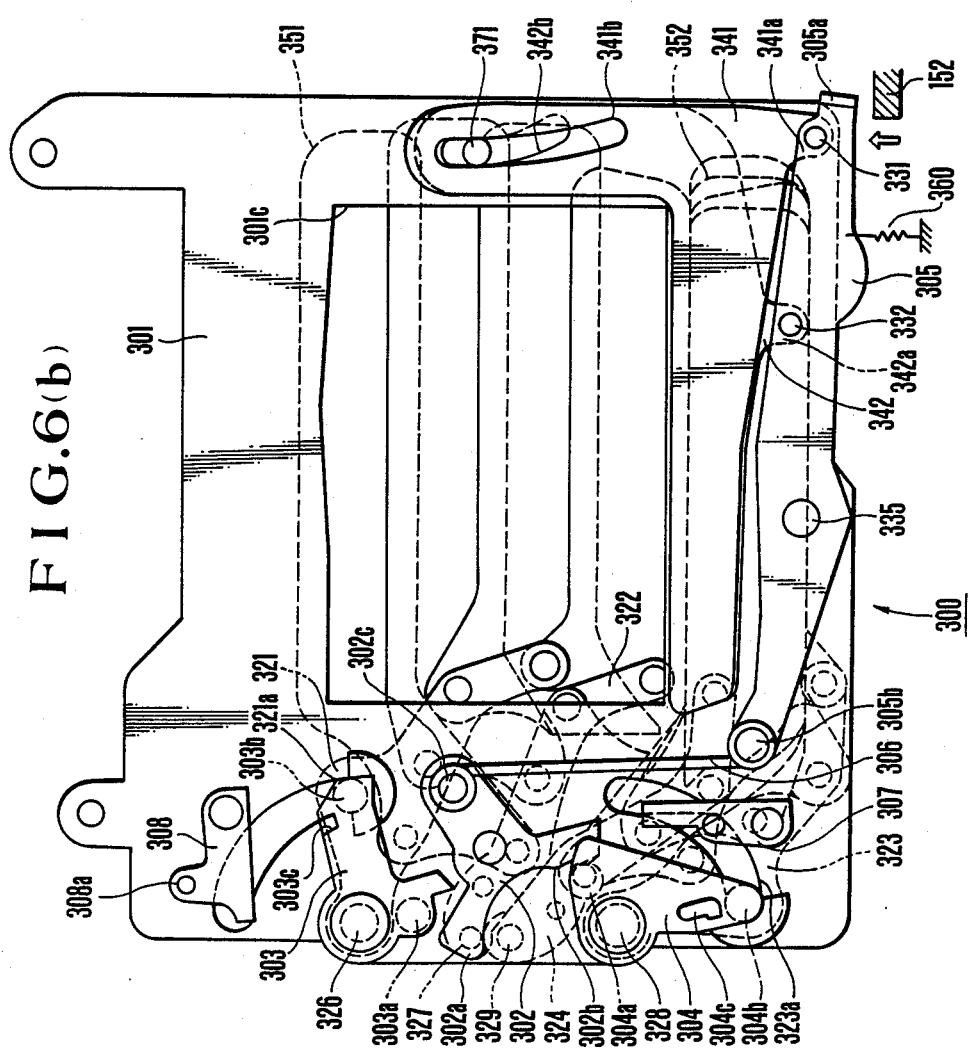

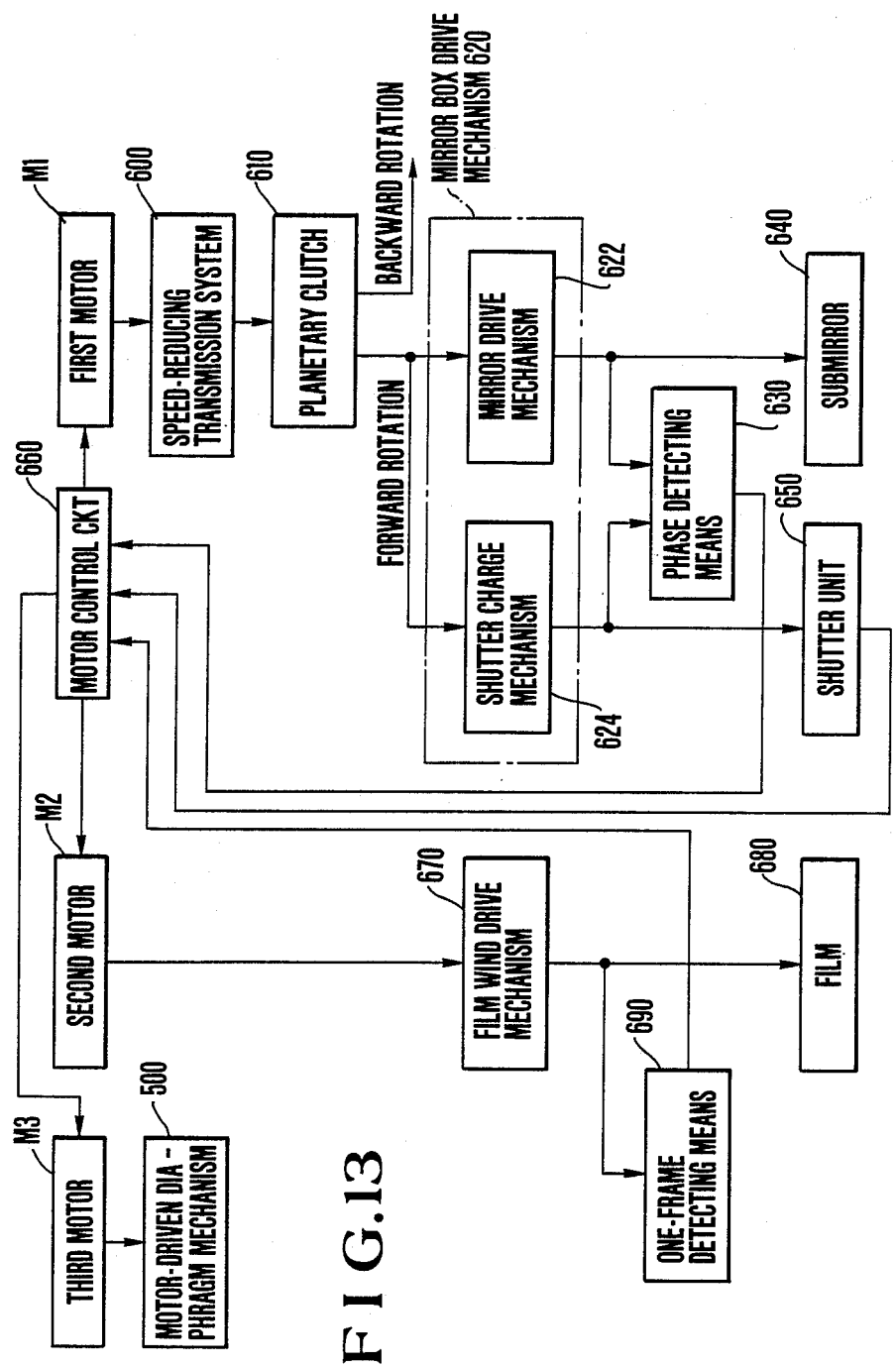
F I G. 13

CAMERA

BACKGROUND OF THE INVENTION:

1. Field of the Invention:

This invention relates to a reflex camera having a half-reflection fixed mirror and other optical elements associated therewith.

2. Description of the Related Art:

Conventionally, as shown in FIG. 16, when in the viewing position, a first optical element 901 (main mirror) for splitting off part of the light passed through the photographic lens (or an object image bearing beam) toward the photographic system, is arranged nearly 45 degrees with respect to an optical axis of the photographic lens and a second optical element 902 (submirror) is arranged nearly 90 degrees with respect to the first optical element 901 to direct the split-off beam for the photographic system downward to a distance measuring device 903. Based on the information of the measured object distance, the photographic lens is adjusted to a certain focusing position. And, as the second stroke of the release button is done, a release actuating signal occurs, starting adjustment of a diaphragm device 904 in the photographic lens to an aperture value previously determined by the output of a light measuring system known to those skilled in the art. At the same time, the first and second optical elements 901 and 902 start to be moved from the viewing position upward to the outside of the photographic optical path by a known mirror drive mechanism. It is after the movements of the diaphragm and the mirrors have terminated (in the state of FIG. 17) that releasing of the shutter is started to make an exposure. The time space from the occurrence of the release signal to the start of the exposure is called the "release time lag", amounting to a range from 100 (mS) in the fast AF cameras to 200 (mS) in the slow one. Even in non-AF cameras, the necessary release time lag ranges from 40 (mS) to 130 (mS). Since this release time lag is the time difference from the moment at which the photographer while looking through the finder has pushed the release button on the chance he thought just right to the actual occurrence of the exposure, a problem arises that for a fast moving object or the like, the intention of the photographer cannot be reflected to the photographs taken.

SUMMARY OF THE INVENTION:

One aspect of this invention is to provide a reflex camera in which as the optical elements use is made of a half-reflection fixed mirror and associated parts therewith with advantages that the finder image becomes visible at all times and that the precedent operation necessary to make an exposure is permitted to start immediately after the distance measuring operation is completed, so that the release time lag is remarkably shortened.

BRIEF DESCRIPTION OF THE DRAWINGS.

FIG. 2 is an exploded perspective view of the main parts of each of the parts of FIG. 1.

FIG. 6(a) and FIG. 6(b) are front elevation views of the main constituent parts of the shutter unit in different operative positions.

FIG. 13 is a block diagram to explain the operating principle which is characteristic of the embodiment according to the invention.

Figure 1:
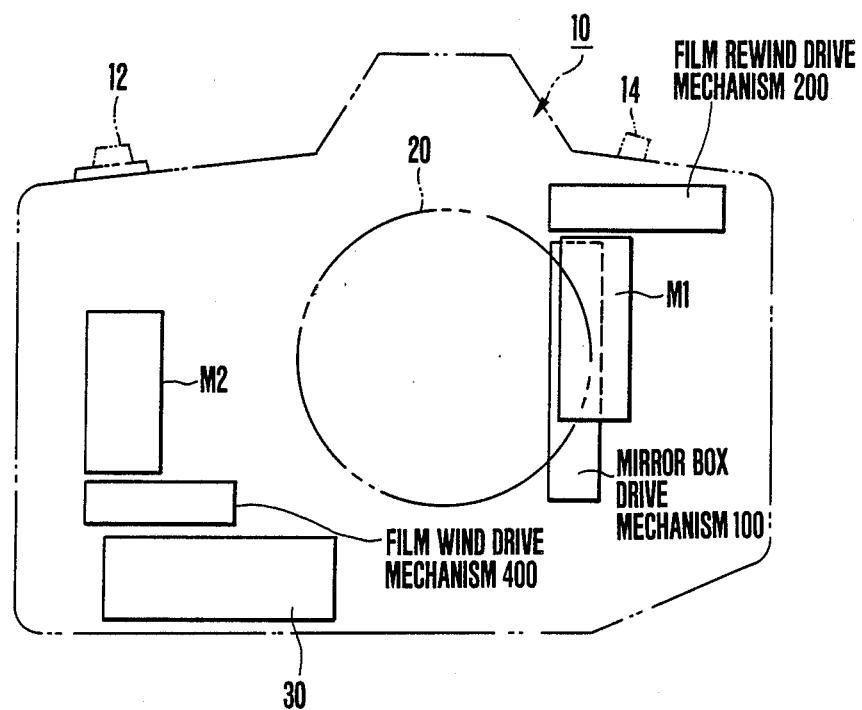
FIG. 1 is a schematic view of the arrangement of the various constituent parts of an embodiment of a motor-driven camera according to the invention.

DETAILED DESCRIPTION OF THE PREFERRED EMBODIMENT:

The characteristic features of the present embodiment are described based on the block diagram of FIG. 13. Rotation of a first motor M1 is adequately sped down by a speed-reducing transmission system 600 and is transferred to two transmission systems selectively by a planetary clutch 610. In more detail, when the first motor M1 rotates in the forward direction, the planetary clutch 610 meshes with the one of the transmission systems which leads to a mirror box drive mechanism 620, or when in the reversed direction, the planetary clutch 610 moves to mesh with the other transmission system. Thus, selection of one of the drive transmission systems is controlled by changing over between the directions of rotation of that first motor M1. As discussion goes with the first motor M1 rotating in the forward direction, this rotation of the first motor M1 is transmitted to a mirror drive mechanism 622 and a shutter charge mechanism 624 both in the mirror box drive mechanism 620.

The mirror drive mechanism 622 performs swinging of a submirror 640. The shutter charge mechanism 624 drives charging of a shutter unit 650 and releases the charging. It should be noted that the phase of a cycle of operation of both mechanisms 622 and 624 is detected by a phase detecting means 630. The detection result of this means 630 is supplied to a motor control circuit 660 when rotation and stopping of the first motor M1 are controlled. It should also be noted that the timed phase relation in which the mirror drive mechanism 622 and the shutter charge mechanism 624 operate is set forth such that the shutter gets a phase of being released from the charging at a phase of swinging down of the submirror 640 that the clearing of the exposure aperture by the mirror down is completed, while that mirror 640, as swinging upward, gets a phase of reaching the position of enabling distance measurement for AF to carry out, at a phase of completing the driving for charging of the shutter.

When the release button is pushed to a first stroke, a first switch is turned on. Responsive to this information, a distance measurement for AF and a light measurement start. At a time when the lens is adjusted to the in-focus state, the motor control circuit 660 commands the first motor M1 to rotate in the forward direction. And, until the submirror 640 has downed to the position of fully clearing the exposure aperture sensed by the phase detecting means 630, the forward rotation of the first motor M1 is continued. In that time, the motor control circuit 660 stops the first motor M1 from rotation. Also, before this state of stopping the first motor M1 has been arrived at, the shutter charge mechanism 624 reaches the phase that allows the shutter unit 650 to be released from the charging activation. After that, when the release button is further pushed to the second stroke, a second switch is turned on. Responsive to this information, the shutter unit 650 starts to run. At a time when information representing that running of the shutter trailing curtain has been completed is supplied to the motor control circuit 660, the control circuit 660 commands the first motor M1 to rotate in the same direction or the forward direction again. By this forward rotation of the first motor M1, the driving power is supplied again to the mirror drive mechanism 622, causing the submirror 640 to move upward. The shutter charge mechanism 624, too, is driven to charge the shutter unit 650. When the charging operation of the shutter charge mechanism 624 takes the phase of the completion sensed by the phase detecting means 630, the stop control of the first motor M1 is done by the motor control circuit 660. Before this point in time, the submirror 640 completes its upping to the position of enabling distance measurement for AF to perform.

Meanwhile, when the above-described in-focus state of the lens is reached, the motor control circuit 660 starts to energize a third motor M3. As a motor-driven diaphragm mechanism 500 is driven, the size of opening of the diaphragm aperture is adjusted to a predetermined value. It should be pointed out that this stopping down of the diaphragm is performed without waiting for the ON information of the second switch.

Next, a specific embodiment of the invention is described in great detail by reference to the drawings. Incidentally, the present embodiment is shown as applied to the single-lens reflex camera.

In FIG. 1 there is shown the layout of all units in the single-lens reflex camera. The camera body generally indicated at 10 has a photographic lens 20 releasably attached thereto. A shutter release button 12 and a film rewind button 14 are on the upper panel of the housing. A battery 30 lies in a chamber therefor on the bottom panel of the housing. To facilitate easy exchanging of the battery 30, the lid of the battery chamber is, of course, formed to also serve as a member for extracting the battery from the chamber. The first motor M1 is used as a common drive source for both a unit of charging a front plate system and the shutter system and moving the submirror and a unit of driving a film rewind system. Reference numeral 100 denotes a mirror box drive mechanism as the front plate system. Reference numeral 200 denotes a film rewind drive mechanism. A second motor M2 is used as a drive source for a film wind drive mechanism 400.

FIG. 2 in exploded perspective view shows all the mechanisms separated unit by unit from one another.

Referring to FIG. 2 and others which show the construction of each of the units, the mechanism of each unit and its operation are described below.

At first, the structure of these units and is described on the basis of FIG. 2.

A camera framework 40, though its detailed feature being omitted to illustrate, is formed entirely with plastic by molding techniques, but metal reinforcements are inserted into the areas surrounding an exposure aperture 41 and other portions which necessitate particularly higher precision accuracy and stronger rigidity. It has four screw-threaded holes 42a to 42d for fasteners by which a mirror box 60 to be described later is mounted thereon in fixedly secured relation and accommodates a spool chamber 43 and a film cartridge chamber 44. A film cartridge 50 contains film 52 convoluted on a supply spool 51 with its leader 56 protruding from its mouth. The film 52 has perforations 54. The mirror box 60 has four holes 61a to 61d formed therein at corresponding positions to the aforesaid holes 42a to 42d on the framework 40 respectively. By putting both holes 42a–42d and 61a–61d in registry with each other and screwing the fasteners into them, the mirror box 60 is rigidly fixed to the framework 40. A fixed mirror 71 has a half-reflection thin-film coating applied over the entire area of the front surface thereof by vacuum evaporating techniques so that the light entering through the lens is divided to two parts at a predetermined ratio, one of which is reflected to a finder optical system (not shown) and the other of which goes through to a photographic system for exposing a frame of the film 52 through the opened shutter unit 300 and aperture 41. A camera-side mount 80 is fixedly secured to the mirror box 60 by screw fasteners and has bayonet pawls 81a–81c for coupling with a lens-side mount (not shown) of the photographic lens 20.

Reference numeral 100 denotes the entirety of the mirror box drive mechanism. This mechanism all is laid on the outside of the mirror box 60. Reference numeral 200 denotes the entirety of the film rewind drive mechanism, part of which is mounted to the outside of the mirror box 60, the remaining being mounted on the framework 40. The first motor M1 as the common drive source of the two mechanisms 100 and 200 is fixedly mounted on the mirror box 60. Reference numeral 300 denotes the entirety of the shutter unit. A shutter base plate 301 has two holes 301a and 302b formed to be used in mounting to the mirror box 60. Therefore, this shutter unit 300 is rigidly fixed to the mirror box 60 by putting the aforesaid holes 301a and 302b in registry with the holes 62a and 62b of the mirror box 60. Reference numeral 400 denotes the entirety of the film wind drive mechanism, all of which, though not depicted in detail in FIG. 2, is assembled in the form of a unit incorporated into the framework 40 at the position of the spool chamber 43.

Next, using FIG. 2 and FIGS. 3(a) through 5(b), the construction and arrangements of the parts of the mirror box drive mechanism 100 is first described in detail.

A base plate 101 is fixed to one side wall (the right hand side wall as viewed in FIG. 2) of the mirror box 60. This base plate 101 rotatably supports all rotating gears of the mirror box drive mechanism 100. A gear 102 on the output shaft of the first motor M1 meshes with a speed-reduction gear 103. A sun gear 104 in mesh with the speed-reduction gear 103 engages a planet gear 105. These gears 104 and 105 are linked with each other by a planet lever 112, so that, depending on the direction of rotation of the sun gear 104, the planet gear 105 takes one of different planetary motions. In more detail, the planet gear 105 is in frictional drive connection with a planet shaft 110 as the center of rotation thereof by a coil spring 111. A bearing 113 fitted on a boss 114 of the base plate 101 as the center of rotation of the sun gear 104 is connected to the planet shaft 110 by the planet lever 112. Therefore, as is understandable from the operative position in FIG. 5(a), as the sun gear 104 rotates in a counterclockwise direction, the planet gear 105 first revolves round in the counterclockwise direction under the friction of the coil spring 111 to engage a start gear 106 of a transmission. And, when the engagement of the planet gear 105 and the transmission gear 106 occurs, the driving power by now overcomes the friction of the coil spring 111 (the planet gear 105 starts to slip in rotating about the planet shaft 110). Thus the planet gear 105 rotates on its own axis (in a clockwise direction) to transmit rotation of the first motor M1 to the start gear 106.

Figure 5A:
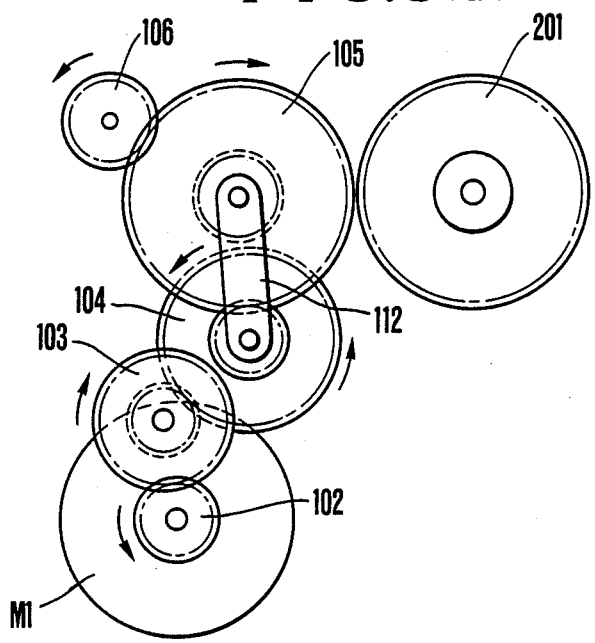
FIG. 5(a) and FIG. 5(b) are top views of the transmission shown in FIGS. 3(a) and 3(b) in changed-over positions.
Figure 5B:
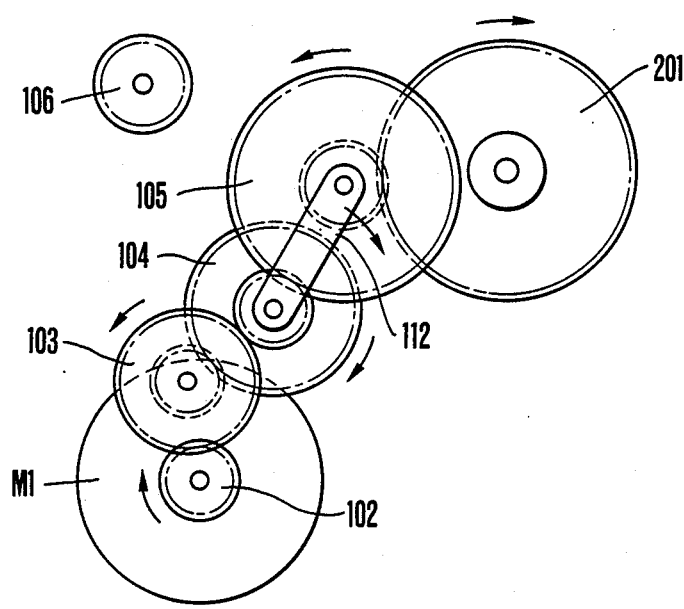

Conversely, as is understandable from the operative position of FIG. 5(b), as the sun gear 104 rotates in the clockwise direction, the planet gear 105 first revolves in the clockwise direction round the boss 114 and then engages a start or rewind gear 201 of another transmission to a rewind system to be described later. When the engagement of the planet gear 105 and the rewind gear 201 occurs, the planet gear 105 starts rotating on its own axis, thus transmitting rotation of the first motor M1 to the rewind gear 201.

The transmission gear 106 when rotating in the counter clockwise direction is becoming the original drive side of the mirror box drive system. The transmission gear 106 is fixed to one end of a transmission shaft 107, the other end of which fixedly carries a worm gear 108. This transmission shaft 107 is restrained from movement in the thrust direction by a pair of receptor portions 115 arranged on the base plate 101 at either thrust position of the worm gear 108.

A submirror drive gear 120 in mesh with the aforesaid worm gear 108 rotates in the clockwise direction. Its front surface has a submirror drive cam 121 formed in unison therewith, and its back surface fixedly carries a brush 122 (formed with an electrically conductive material) for position detection. Incidentally, this mirror drive gear 120 is rotatably supported on a boss 116 of the base plate 101. In here, for the aforesaid mirror drive cam 121, an ascendant camming surface 121a for driving a mirror drive lever 130 to be described later in the counterclockwise direction, a flat camming surface 121b for keeping that drive lever 130 in the turned position (with the submirror in the downed state) and a descendant camming surface 121c for allowing that drive lever 130 to turn in the clockwise direction are formed.

The submirror drive lever 130 is comprised of two lever elements in fixedly secured relation to each other in a shape of the letter "L", is rotatably supported on a boss 117 of the base plate 101 and has a role as a cam follower for the aforesaid submirror drive cam 121. That is, this submirror drive lever 130, when its one end 131 is sliding on the ascendant camming surface 121a of the mirror drive cam 121, is driven to rotate in the counterclockwise direction, then when is sliding on the flat camming surface 121b, is held stationary in the most counterclockwise position, and then when sliding on the descendant camming surface 121c (actually, the one end portion 131 and the descendant camming surface 121c need not always come into contact with each other, provided they face at each other), allows it to turn in the clockwise (return). And, the other end portion 132 of the submirror drive lever 130, under the control of each of the camming surfaces of the submirror drive cam 121, performs the mirror downing (turning to the exposure aperture cleared position) operation of the submirror 70 when it pushes a mirror pin 74 to be described later, then keeps the mirror downed state by continuing holding the pressure on the mirror pin 74, and then releases the mirror pin 74 from the pressure to allow for upping of the submirror (returning of the submirror to the AF operative position).

A shutter charge gear 140 in mesh with the aforesaid mirror drive gear 120 rotates in the counterclockwise direction. Its front surface is formed in unison with a shutter charge cam 141. It should be noted that this shutter charge gear 140 shares transfer of torque at 1:1 (or a speed reduction ratio of 1.0) with the mirror drive gear 120. It is rotatably supported on a boss 118 of the base plate 101. In here, for the aforesaid shutter charge cam 141, an ascendant camming surface 141a for driving a shutter charge lever 150 to be described later to turn in the counterclockwise direction, a flat camming surface 141b for keeping the shutter charge lever 150 in the turned position (charging state) and a descendant camming surface 141c for allowing the charge lever 150 to turn in the clockwise direction are formed.

The shutter charge lever 150 of almost the letter "L" shape is rotatably supported on a boss 119 of the base plate 101, and has a role of a cam follower for the shutter charge cam 141. That is, this shutter charge lever 150, when a roller 151 on one end thereof is contacting with the ascendant camming surface 141a, is driven to turn in the counterclockwise direction, then when with the flat camming surface 141b, remains stationary in the most counterclockwise position, and then when the descendant camming surface 141c comes under the roller 151, is allowed to turn in the clockwise direction. And, another roller 152, which is supported on the other end portion of the shutter charge lever 150, while receiving the corresponding control to the turned position of each camming surface of the shutter charge cam 141, performs the charging operation of the shutter by pushing one end 305a of a seesaw lever 305 to be described later in the shutter unit 300, then keeps the charging operation by continuing the hold of the seesaw lever 305 in the pushed position (though description about the shutter unit 300 will be made later, the shutter unit 300 in the present embodiment is so constructed that the continuing of the charging operation can be done by mechanically holding both of the leading and trailing curtains of the shutter in their preparing positions for running) and then returns the seesaw lever 305 by releasing the seesaw lever 305 from the pushed position (releases both of the leading and trailing curtains of the shutter from the mechanical latching connection to thereby make it possible for the shutter to run under the control of the power supply to the electromagnets for control).

Figure 3A:
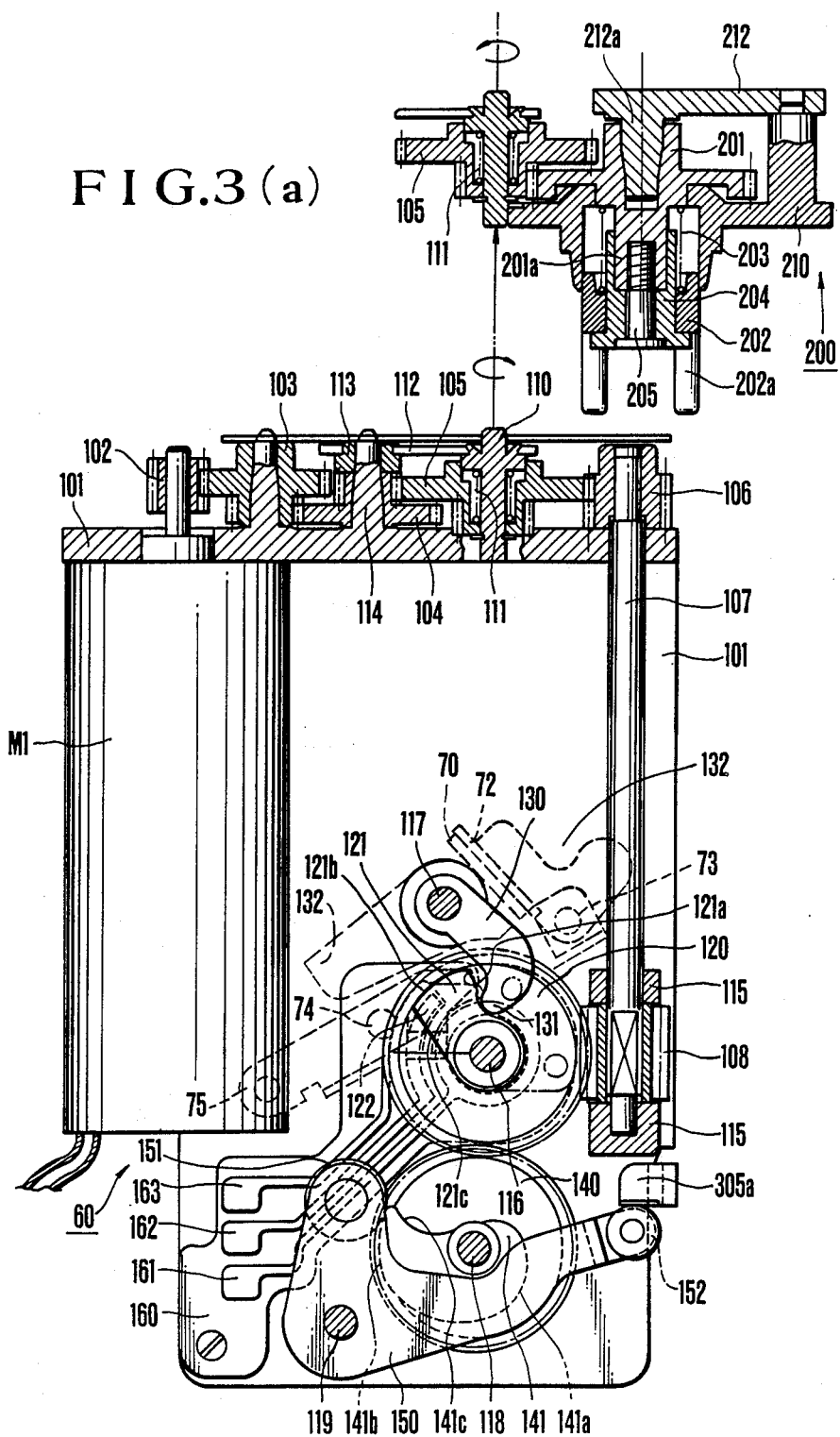
FIG. 3(a) and FIG. 3(b) are partly side elevation partly sectional views of the mirror box drive mechanism and film rewind drive mechanism shown in FIG. 2 in different operative positions.
Figure 3B:
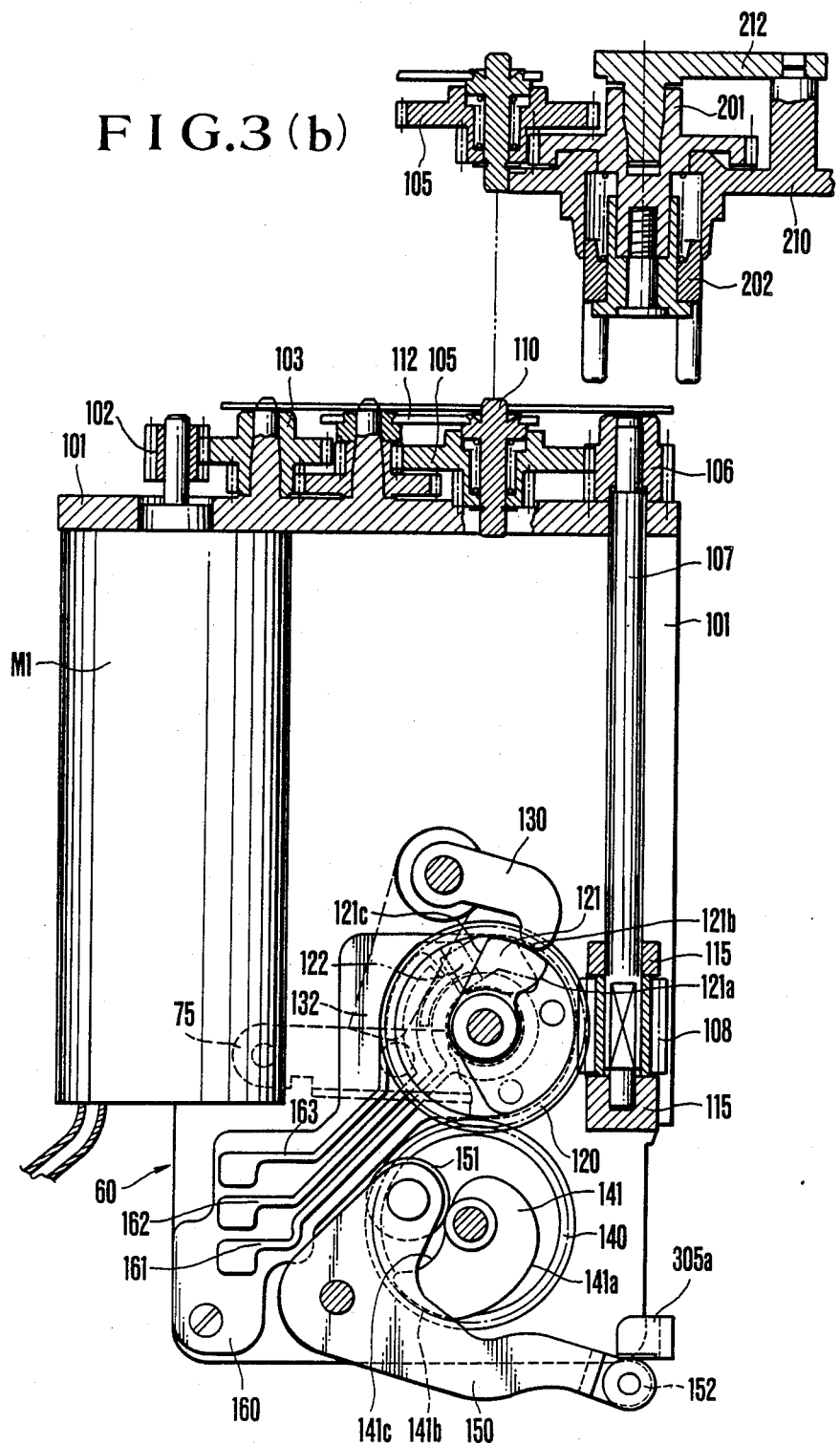

It should be noted that, as is easily understandable from the comparison of both of FIG. 3(a) and FIG. 3(b), that phase of rotation of the aforesaid submirror drive cam 121 which causes the submirror drive lever 130 to set the submirror 70 down and that phase of rotation of the aforesaid shutter charge cam 141 which causes the aforesaid seesaw lever 305 to carry out charging are set forth in completely displaced relation. In other words, as shown in FIG. 3(a), when the shutter charge cam 141 is pushing the seesaw lever 305 to effect charging, the mirror drive cam 121 will not push the submirror drive lever 130. Hence the movable mirror 70 is permitted to remain in the upped state (or in the AF distance measuring position). As shown in FIG. 3(b), when the mirror drive cam 121 has rotated to a phase where the mirror drive lever 130 sets the movable mirror 70 down (in the exposure aperture clearing position), the shutter charge cam 141 stops pushing the seesaw lever 305. Hence the shutter unit 300 is released from the charging activation, and the leading and trailing curtains of the shutter are made ready to run as they are released from the mechanical hold.

A signal substrate 160 is fixedly secured to the base plate 101 by screw fasteners. On this signal substrate 160 there are formed three line patterns for position detection, namely, a ground pattern 161, a pattern 162 for detecting the end of a range of movement and an overrun detection pattern 163 by vacuum evaporating techniques or others. Each of these patterns 161-162 cooperates with a brush 122 fixedly mounted on the back side of the aforesaid submirror drive gear 120 in such a relation as described below by reference to FIG. 4(a) and FIG. 4(b).

Here, a sliding portion 122a of this brush 122 is divided in comb form to enhance assurance of good safety of contact with the patterns 161-163 on the signal substrate 160. Incidentally, the actual sliding positions, or contact points, of this sliding portion 122a lie on a line 122b slightly inner from the tip of the brush.

Figure 4A:
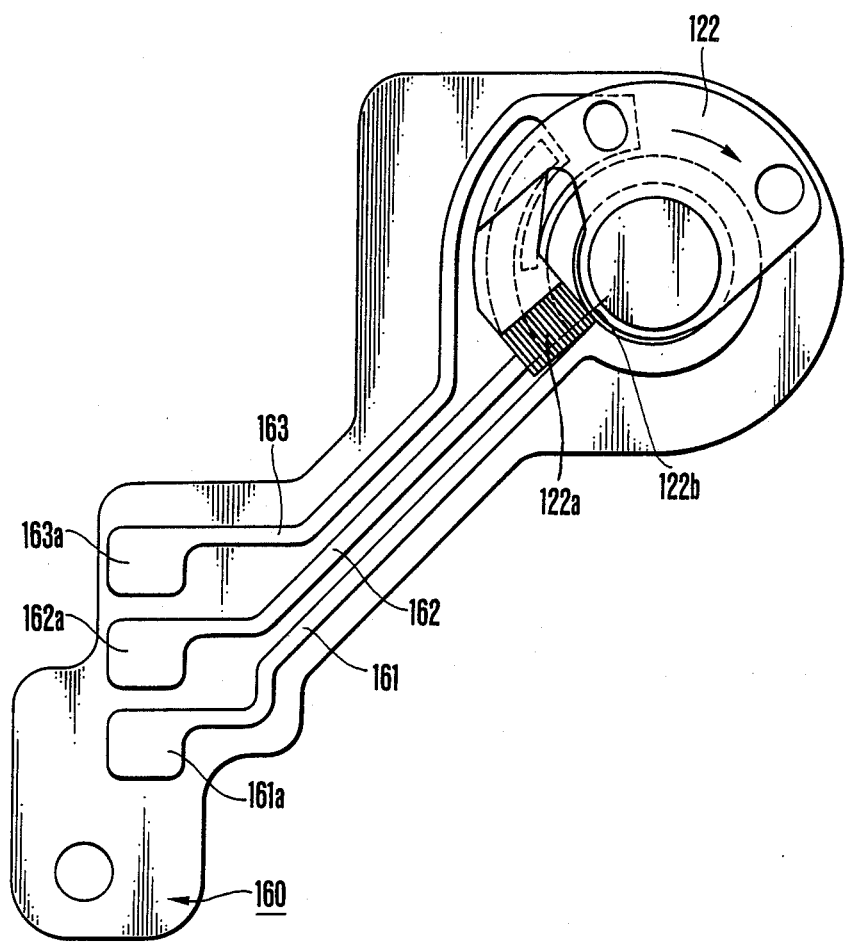
FIG. 4(a) and FIG. 4(b) are top views of the phase detector shown in FIGS. 3(a) and 3(b) in different operative positions.

FIG. 4(a) corresponds to FIG. 3(a) in the phase at which the completion of charging of the shutter is detected. As the mirror drive gear 120 rotates in the clockwise direction, the brush 122 revolves in the clockwise direction as shown by an arrow. When the state of FIG. 4(a) is reached, the sliding portion 122a comes into contact with both of the ground pattern 161 and the motion terminal end detecting pattern 162 so that the potential at a connector portion (or land portion) 162a of that detecting pattern 162 changes to ground level. In such a manner, the completion of charging of the shutter is detected. Explaining about this detection in a bit greater detail, a connector portion (or land portion) 161a of the ground pattern 161 is supplied with a signal of ground level equal to that in a camera control circuit to be described later. Meanwhile, the output at the connector portion 162a of the motion terminal end detecting pattern 162 is supplied to that camera control circuit (at an input port P11 in FIG. 9). And, when the brush 122 lies in a bit earlier position than the position of FIG. 4(a), (for better understanding, the brush 122 would turn very short distance on the other way round from the position of FIG. 4(a)), the sliding portion 122a of the brush 122 is in contact only with the ground pattern 161. Hence this detecting pattern 162 does not yet change to the ground level. And, from here, the mirror drive gear 120 further rotates in the clockwise direction, and, at the same time, the brush 122 too revolves in the clockwise direction. Upon arriving at the position of FIG. 4(a), the brush 122 (of electrically conductive material) comes into contact even with the motion terminal end detecting pattern 162. The potential of the motion terminal end detecting pattern 162 takes the ground level through the brush 122, so the aforesaid camera control circuit detects that the charging of the shutter is completed, and stops the first motor M1 from further rotating. Incidentally, the reason for the difference between the before-described position of the brush 122 shown in FIG. 4(a) and the above-described position of the brush 122 shown in FIG. 3(a) is that the control for stopping the first motor M1 begins (with braking) at the position of FIG. 4(a), but, because the first motor M1 cannot instantly stop, a slight overrunning takes place. After having overrun, the first motor M1 stops in that position which is shown in FIG. 3(a). It should be noted in connection with FIG. 3(a) that the stopped position of the submirror drive gear 120 (or the brush 122) is illustrated for the purpose of clarity on assumption that the aforesaid overrun becomes maximum on calculation. In most actual cases, therefore, the submirror drive gear 120 may overrun a much shorter distance before it stops. Again, as is apparent from FIG. 3(a), that part of the camming surface of the shutter charge cam 141, or the camming surface 141b, which enables the shutter to continue being charged is flattened to such a length that copes with the above-described maximum possible overrunning of the first motor M1.

Figure 4B:
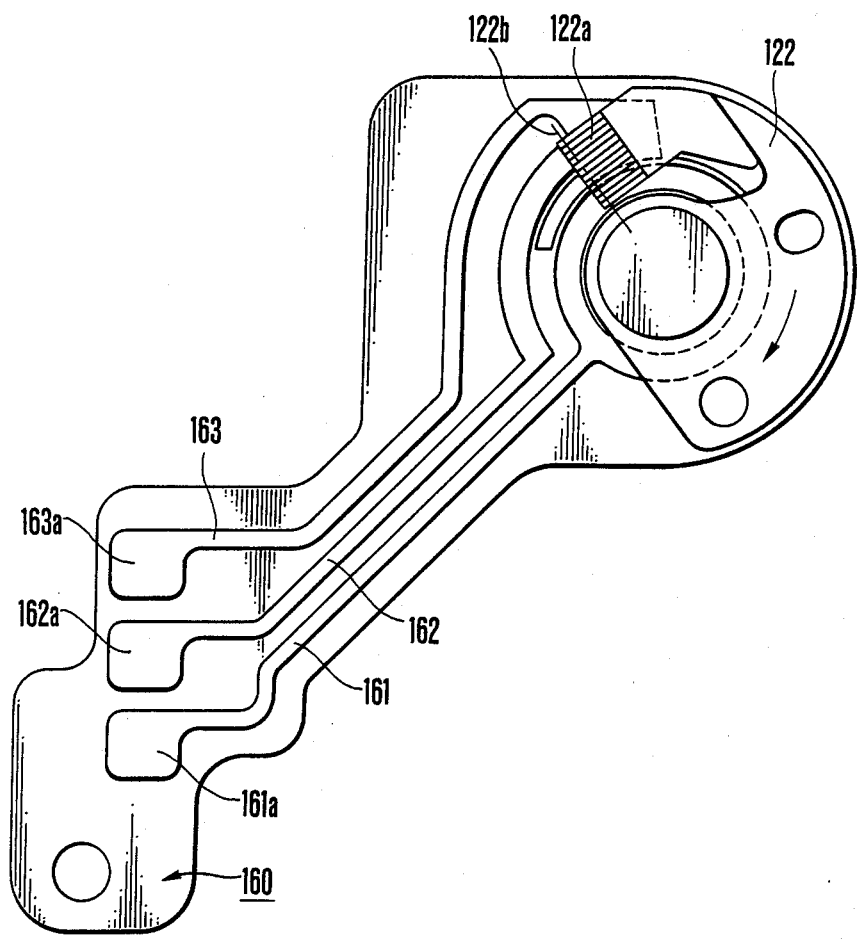

Meanwhile, FIG. 4(b) corresponds to FIG. 3(b) in the phase of detecting completion of downing of the submirror 70. The brush 122 revolves from the position of FIG. 4(a) to the clockwise direction as indicated by an arrow in response to rotation of the mirror drive gear 120 in the same or clockwise direction. Arriving at the position of FIG. 4(b), the sliding portion 122a transits from the contact with both of the ground pattern 161 and the motion terminal end detecting pattern 162 to the non-contact with that detecting pattern 162, thus changing the potential at the connector portion (or land portion) 162a of the detecting pattern 162 from the ground level to the initial level (usually H (for high) level). This change is used to detect when the downing of the submirror is completed. Explaining this detection in more detail, when the brush 122 is in a bit earlier position than that of FIG. 4(b) (this can be understood by supposing that the brush 122 would turn from the position of FIG. 4(b) to the other way round, or the counterclockwise direction), the brush 122 is kept in contact with both of the ground pattern 161 and the motion terminal end detecting pattern 162, so that the output at the connector portion 162a of that motion terminal end detecting pattern 162 supplies the signal of ground level to the camera control circuit. And, from here the submirror drive gear 120 further rotates in the clockwise direction and, at the same time, the brush 122, too, revolves in the clockwise direction. When the position of FIG. 4(b) is reached, the brush 122 comes into the state of being out of contact with the motion terminal end detecting pattern 162, thereupon changing the potential of the motion terminal end detecting pattern 162 from the ground level to the initial level. Responsive to detection of this change, as it implies that the downing of the submirror 70 is completed, the camera control circuit starts controlling the stopping operation of the first motor M1 from further rotation. The reason for the difference between the before-described position of the brush 122 shown in FIG. 4(b) and the above-described position of the brush 122 shown in FIG. 3(b) is that though the first motor M1 starts to be de-energized with the braking effect at the position of FIG. 4(b), the first motor M1 cannot instantly get stopped, and will somewhat overrun to the position which is shown in FIG. 3(b) before it stops. For the purpose of clarity, the stopped position of the mirror drive gear 120 (or the brush 122) is illustrated in FIG. 3(b) on assumption that the overrunning distance takes the maximum possible value as determined on calculation. Actually, the mirror drive gear 120 can stop in a much shorter overrunning distance. As is apparent from FIG. 3(b), to cope with that overrunning, the flat camming surface 121b is formed in the mirror drive cam 121 and its length is determined by taking into account the maximum possible distance the first motor M1 overruns. Here, concerning the relationship between the above-described shutter charge and mirror down, a further explanation about the coordination is added. At first, what is important is that all the operations, that is, the charging of the shutter, the downing of the mirror, the releasing of the shutter from being charged, and the upping of the mirror, are performed by one and the same direction of rotation of the first motor M1. That is, as the first motor M1 has rotated in the counterclockwise direction (the output gear 102 has rotated in the counterclockwise direction), the planet gear 105, while being rotated in the counterclockwise direction, is brought into engagement with the transmission gear 106. Under this condition, all the operations are performed. And, the rotating power of the first motor M1 causes the submirror drive gear 120 to rotate in the clockwise direction and the shutter charge gear 140 to rotate in the counterclockwise direction. And, another feature appears that the occurrence of angular positions for allowing the mirror to move upward (FIG. 3(a)) of the submirror drive cam 121 on the mirror drive gear 120 coincides with the occurrence of angular positions for charging the shutter (FIG. 3(a)) of the shutter charge cam 141 on the shutter charge gear 140. Still another feature is that the occurrence of angular positions for moving the mirror down (FIG. 3(b)) of the submirror drive cam 121 coincides with the occurrence of angular positions for releasing the shutter from the charging activation (FIG. 3(b)) of the shutter charge cam 141. And, such a sequence of the operations is controlled without having to change the direction of rotation of the first motor from the counterclockwise one. For this purpose, the operation of the first motor M1 is controlled by the brush 122 sliding on the patterns 161-163 in such a manner that, when the charging of the shutter is completed (FIG. 3(a)), it once stops, then when actuation of a release is later detected by the camera control circuit, it rotates again in the same direction, then when the downing of the mirror is completed (FIG. 3(b)), it once stops for the second time, then when the running of the trailing curtain of the shutter is later detected by the camera control circuit, it rotates again in the same direction, and then when the charging of the shutter is completed, it once stops for the third time. This procedure is repeated each time a shot is taken. Now, the overrun detecting pattern 163 is provided for detecting that the first motor M1, when de-energized, overruns a longer distance than the predetermined one before it stops, as the potential of this pattern 163 changes. Concretely speaking, if the overrun detecting pattern 163 changes its potential from the initial level to the ground level at the time when the charging of the shutter has been completed in the position of FIG. 4(a), or if the overrun detecting pattern 163 changes its potential from the ground level to the initial level at the time when the upping of the mirror has been completed in the position of FIG. 4(b), the fact that an excessive overrunning has occurred is detected.

Next, the construction of the submirror 70 rotatably supported in the mirror box 60 is described.

The submirror 70 is carried on a support plate 72. This support plate 72 has pivot stubs 73 on either side at the end portions. By these pivot stubs 73, it is rotatably supported on a submirror drive plate 75. And, a mirror pin 74 is formed on one of the side walls of this submirror drive plate 75. This mirror pin 74 and the aforesaid mirror drive lever 130 are made engageable. The aforesaid support plate 72 receives a springing bias force always in the clockwise direction (or in the mirror up direction) by a spring 76 (see FIG. 14). When the aforesaid mirror drive lever 130 has come into the mirror up allowable state (FIG. 3(a)), the submirror 70 turns in the clockwise direction by the bias force of that spring 76, returning to the mirror up (AF distance measuring position) state. The submirror drive plate 75 also receives a springing bias force always in the counterclockwise direction by a spring 77. When the aforesaid mirror drive lever 130 has come into the mirror up allowable state, the submirror drive plate 75 turns in the counterclockwise direction by the bias force of the spring 77, returning to the mirror up state.

Figure 6A:
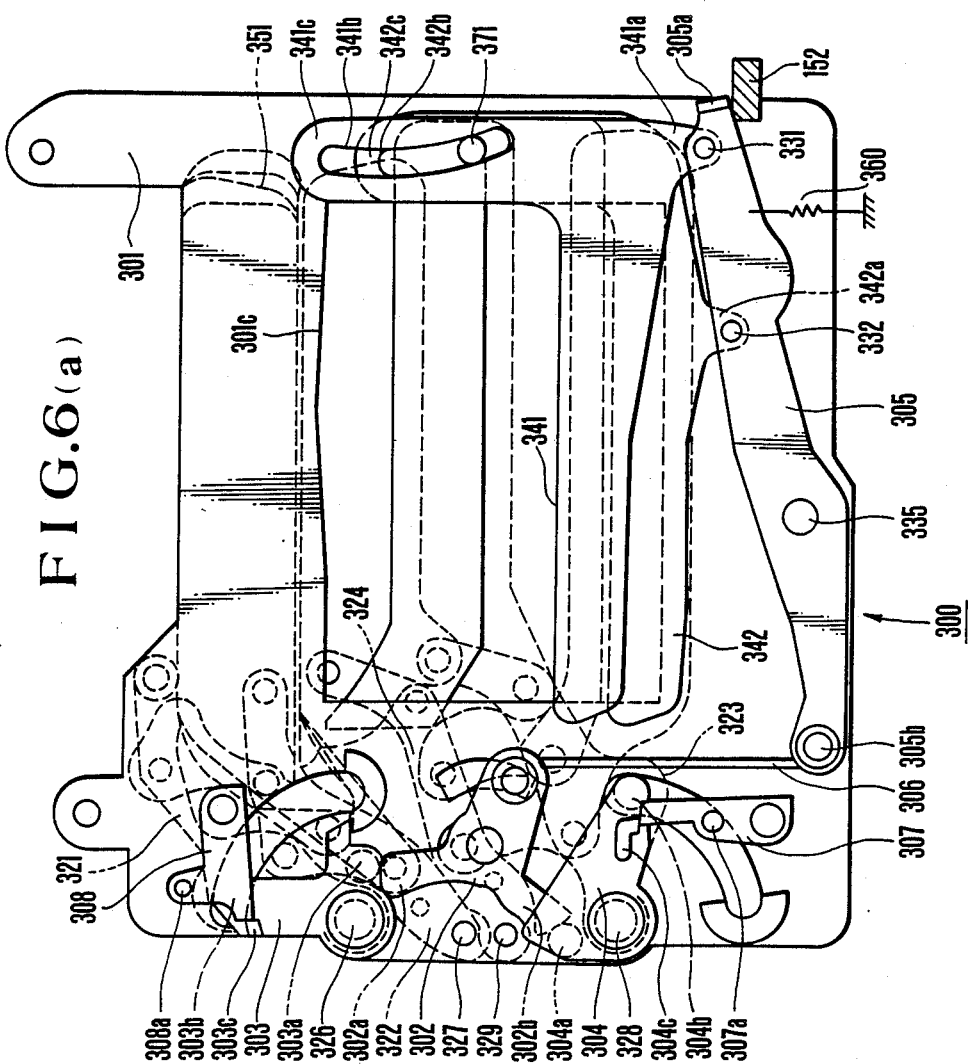

Next, the construction of the shutter unit 300 to be assembled with the mirror box 60 is described on the basis of FIG. 6(a) and FIG. 6(b).

FIG. 6(a) shows the shutter charge completion state, and FIG. 6(b) shows the state in which both curtains of the shutter have run after the release of the shutter charge.

In these figures, reference numeral 301 denotes a shutter base plate constituting the aforesaid support frame, and reference numeral 301a denotes its exposure aperture.

A charge lever 302 for charging trailing and leading blade drive levers (hereinafter called the "drive levers" for short) 303 and 304 lies in the shutter unit 300. This constitutes shutter drive means. The aforesaid trailing drive lever 303 is to run a trailing blade group 351, and the aforesaid leading blade drive lever 304 is to run a leading blade group 352.

A seesaw lever 305 for charging up the shutter unit is rotatably mounted about a pivot pin 335 planted on the shutter base plate 301 and arranged so that when its one end 305a receives a rotating power in the direction indicated by an arrow from a roller 152 of the shutter charge lever 150 of the shutter charge mechanism shown in FIG. 3(a) and FIG. 3(b), the other end 305b turns in the counterclockwise direction of FIG. 6(b), causing a foot 302c of the aforesaid charge lever 302 to turn in the clockwise direction as viewed in the figure through a link lever 306 operatively connected thereto. Transition from the state of FIG. 6(b) to the state of FIG. 6(a) results in the end of the charging.

a leading latch lever 307 and a trailing latch lever 308 hinder rotation of the leading drive lever 304 and the trailing drive lever 303 from their charged positions by the charge lever 302 until respective actuating signal for running the shutter are produced from the camera control circuit to be described later. Arms 321 and 322 for running the trailing blades hold the trailing blade group 351 in parallel linked relation and turn about respective pivot pins 326 and 327 to run the trailing blade group 351. Also, arms 323 and 324 for running the leading blade group 352 hold the leading blade group 352 in parallel linked relation and turn about respective pivot pins 328 and 329 to run the leading blade group 352.

And, in the present embodiment, in addition to the foregoing constituent members, the shutter unit 300 further includes a light shielding device comprising two light shielding blades 341 and 342 in pair arranged to move upward from a retracted position of FIG. 6(b) to a light shielding position of FIG. 6(a) in response to rotation of the aforesaid seesaw lever 305 when charging up operates.

For the light shielding device in the present embodiment, the two light shielding blades 341 and 342 formed to the letter "L" shape have their rise portions of the letter "L" shape mounted on the shutter base plate 301 by pin-and-slot connections so that the upward and downward movements are guided, and have their leg portions 341a and 342a of the letter "L" connected to the aforesaid seesaw lever 305 through pivot pins 331 and 332 respectively so that drive connections for the upward and downward movements are given.

The aforesaid guide mechanism is so constructed that a guide pin 371 planted on the shutter base plate 301 engages in nearly, vertically elongated slots 341b and 342b formed in the rise portions 341c and 342c of the light shielding blades 341 and 342.

With the structure described above, when the seesaw lever 305 turns in the counterclockwise direction as viewed in FIG. 6(a), the light shielding blades 341 and 342 are moved upward from FIG. 6(b) to FIG. 6(a) by the guide mechanism, while keeping the attitude almost similar to that shown in the figures. When the seesaw lever 305 turns in the clockwise direction, they are moved downward from FIG. 6(a) to FIG. 6(b). Moreover, the pivot pins 331 and 332 at which the light shielding blades 341 and 342 connect with the seesaw lever 305 are made to differ in position from each other by a certain distance. By this, their strokes of upward or downward movement are different to reduce the volume of space they occupy when in the retracted position and to assure that when in the light shielding position, they expand with their adjacent edges overlapping to cover the predetermined size of light shielding area. A spring 360 urges the seesaw lever 305 always in the clockwise direction (or in the charge release direction).

Figure 7:
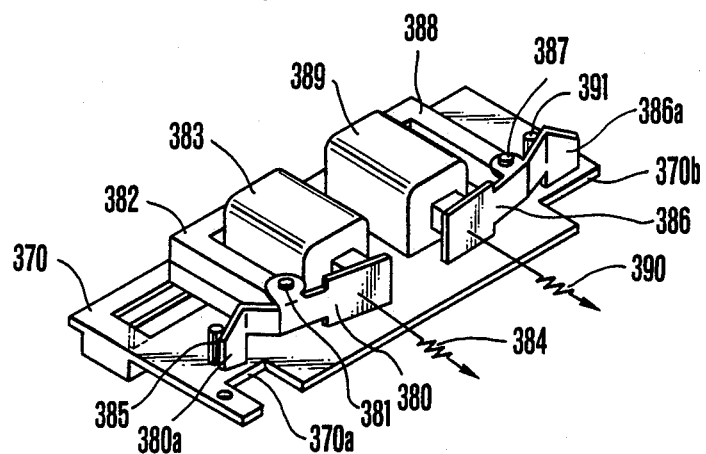
FIG. 7 is a perspective view illustrating the construction of a running control mechanism for the shutter unit of FIGS. 6(a) and 6(b).

In FIG. 7, there is shown a latch release arrangement. This latch release arrangement itself employs the form disclosed in Japanese Laid-Open Patent Application No. Sho 57-17936.

In the figure, reference numeral 307 denotes a base plate of the latch release arrangement. It bears electromagnets controlling the latch release. Incidentally, this base plate 370 is assembled with the shutter base plate 301 of FIGS. 6(a) and 6(b). An armature lever 380 for the leading blades and another armature lever 386 for the trailing blades are rotatably supported respectively about pivot pins 381 and 387 on yokes 382 and 388 mounted on the base plate 370, and urged by springs 384 and 390 in the clockwise and counterclockwise directions respectively. Stopper pins 385 and 391 are planted on the base plate 370 to define the initial positions of rotation of the armature levers 380 and 386 respectively. One end portion 380a of the armature lever 380, when in a position as turned a predetermined distance in the counterclockwise direction from the initial position shown in FIG. 7, abuts on a pin 307a of a leading latch lever 307 and is able to release the latch. Also, one end portion 386a of the armature lever 386, when in a position as turned a predetermined distance in the clockwise direction from the initial position shown in FIG. 7, abuts on a pin 308a of the trailing latch lever 308 and is able to release the latch. Coils 383 and 389, when supplied with current, attract the armature levers 380 and 386 to turn against springs 384 and 394 respectively. Incidentally, in the figure, reference numeral 370a denotes a cutout portion on which the pin 307a of the leading latch lever 307 abuts in the shutter charged state (FIG. 6(a)). Incidentally, though omitted in FIG. 6(a) from the reason of complicating the illustration, the leading latch lever 307 is urged by a weak spring in the counterclockwise direction so that the aforesaid pin 307a abuts on the inner edge of the aforesaid cutout portion 370a. Also, in the figure, reference numeral 307b denotes a cutout on which the pin 308a of the trailing latch lever 308 abuts. Incidentally, though omitted in FIG. 6(a) from the reason of complicating the illustration, the trailing latch lever 308 is urged by a weak spring in the clockwise direction so that the aforesaid pin 308a abuts on the inner edge of the aforesaid cutout portion 370b. Incidentally, in FIG. 2, reference numeral 392 denotes a cover which also serves as a dust proof and an electromagnet shield.

In the following, the operation of the shutter unit described above is described.

The camera, when the sequence of photographing operations has ended and the shutter has run to the exposure aperture closed position, takes the state of FIG. 6(b).

Then the charging operation is immediately performed to prepare for the next cycle of photographic operation.

This charging operation is given by the rotation drive of the counterclockwise direction of the shutter charge lever 150 shown in FIG. 2 and FIGS. 3(a) and 3(b). This charging operation is that the acting force of the direction indicated by an arrow in the figure is given from the roller 152 of the shutter charge lever 150 to the free end 305a of the seesaw lever 305 and the rotative movement (of the clockwise direction of the figure) is given to the charge lever 302 through the link lever 306 engaged with the pin 305b of the other end of the seesaw lever 305 and the pin 302c planted on the charge lever 302.

As the charge lever 302 turns, the foot portions 302a and 302b of the charge lever 302 abut on the roller portions 303a and 304a of the drive levers 303 and 304 respectively and give rotative movement to the drive levers 303 and 304.

When the drive levers 303 and 304 turn, rotative movements are given to the trailing blade running arm 321 and the leading blade running arm 323 with the hole portions 321a and 323a in engagement on the respective pins 303b and 304b, so that the trailing blade group 351 and the leading blade group 352 linked to the respective arms are moved upward in the figure.

As the charging progresses in such a manner, when the projected portions 303c and 304c of the drive levers 303 and 304 reach the positions at which they become able to the free ends of the aforesaid latch levers 307 and 308, the shutter charging ends and the next release actuation is waited for in the state of FIG. 6(a).

Here, in the course that the seesaw lever 305 is being charged, the light shielding blade 341 and the light shielding blade 342 rotatably mounted respectively about the pivot pins 331 and 332 on the seesaw lever 305 are moved upward as viewed in the figure. At this time, because the light shielding blade 341 and the light shielding blade 342 have their respective guide slots 341b and 342b engaged on the guide pin 371, their attitudes are regulated by the guide pin 371 so that they keep almost horizontal positions as viewed in the figure during the time when they move upward. In the charging completed state, they moves to the position of FIG. 6(a) and cover the lower portion of the exposure aperture 301a of the shutter base plate 301.

In this state (FIG. 6(a)) the charging is completed, and waiting is done in this state until the next release operation is carried out.

Next, the releasing operation is described.

When the release button 12 is pushed, the mirror down operation described in FIGS. 3(a) and 3(b) is carried out and, at the same time, the shutter charge lever 150 retracts from the position shown in FIG. 6(a) to the position shown in FIG. 6(b). Then the seesaw lever 305 is turned in the clockwise direction by the spring member 360, giving the rotation of the counterclockwise direction to the charge lever 302 linked with the seesaw lever 305 by the link lever 306. These members change from the state of FIG. 6(a) to the state of FIG. 6(b).

In accompaniment with the aforesaid rotation of the seesaw lever 305, the light shielding blade 341 and the light shielding blade 342 rotatably mounted on the seesaw lever 305 by the pivot pins 331 and 332 are caused to work with the respective guide slots 341b and 342b regulated by the guide pin 371, while keeping the almost horizontal state as viewed in the figures, moving from the state of FIG. 6(a) to the state of FIG. 6(b). Thus, they retract to the outside of the exposure aperture 301a of the shutter base plate 301.

After the foregoing operation terminates, when the camera control circuit detects the completion of downing of the submirror 70 (or the change of the potential of the mirror down detecting pattern 162 from the ground level to the initial level in the state of FIG. 4(b)), the coil 383 of FIG. 7 is first supplied with current by that camera control circuit. The armature lever 380 is pulled to the attraction surface of the yoke 382, so that it turns in the counterclockwise direction against the spring 384. And, by this rotation of the attracted armature lever 380, one end portion 390a pushes the pin 307a so that the leading latch lever 307 turns in the clockwise direction to disengage from the projected portion 304c. The leading drive lever 304 turns in the clockwise direction, and the leading blade running arm 323 also turns in the same direction, causing the leading blade group 352 to run (downward as viewed in the figure) and initiating an exposure. And, in a predetermined shutter time, by the camera control circuit, current supply to the coil 389 of FIG. 7 is carried out. The armature lever 386 is pulled to the attraction surface of the yoke 388 so that it turns in the clockwise direction against the spring 390. And, by this rotation of the attracted armature lever 386, one end portion 386a pushes the pin 308a and the trailing latch lever 308 turns in the clockwise direction to disengage from the projected portion 303c. The trailing drive lever 303 turns in the clockwise direction, and the trailing blade running arm 321 also turns in the same direction, causing the trailing blade group 351 to run (downward as viewed in the figure), and terminating the exposure.

The explanation up to here is on the mirror box drive mechanism 100 and the shutter unit 300 built into the mirror box 60.

Figure 8:
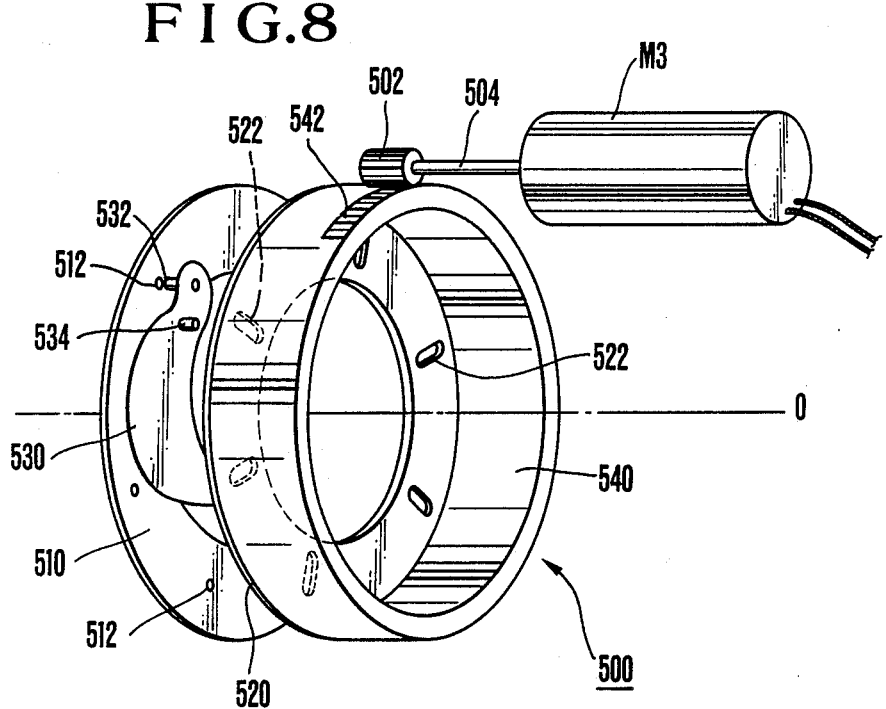
FIG. 8 is a perspective view illustrating the construction of a drive mechanism for the diaphragm in the photographic lens.

Next, on the basis of FIG. 8, a motor-driven diaphragm mechanism 500 incorporated in the photographic lens 20 shown in FIG. 1 is described. In the figure, a third motor M3 is fixedly secured to a fixed barrel (not shown). A fixed disc 510 of ring shape has a plurality of holes 512 formed on a circle with its center at an optical axis O in equally spaced relation. A diaphragm drive disc 520 of ring shape is rotatably supported and has a plurality of cam slots formed on a circle in equally spaced relation. Diaphragm blades 530 are arranged in a space between the fixed disc 510 and the diaphragm drive disc 520. Pins 532 and 534 planted on either side of each diaphragm blade 530 extend into the hole 512 of the fixed disc 510 and the cam slot 522 of the diaphragm drive disc 520 respectively. A gear tube 540 is rotatably supported and is fixedly secured to the diaphragm drive disc 520. And, this gear tube 540 has a geared portion 542 formed in the outer peripheral surface thereof, and this geared portion 542 is in mesh with a pinion 502 fixedly mounted on the output shaft 504 of the third motor M3.

The operation is as follows: As the third motor M3 rotates in a counterclockwise direction, the gear tube 540 rotates in a clockwise direction. Along with this, the diaphragm drive disc 520 also rotates in the clockwise direction, so that the diaphragm blades 530 are driven in the counterclockwise direction by the sliding action with the cam slots 522. That is, the diaphragm is driven in a direction to stop down from the full open aperture to smaller sizes of opening of the diaphragm aperture.

Meanwhile, by the clockwise rotation of the third motor M3, the gear tube 540 rotates in the counterclockwise direction. Along with this, the diaphragm drive disc 520 also rotates in the counterclockwise direction, causing the diaphragm blades 530 to move in the opening direction (or clockwise direction) by the sliding connection with the camming slots 522. That is, the diaphragm is driven in the reversed direction from the stopped down state to the full open state.

Next, a practical example of the arrangement of all the above-described mechanisms with a coordination control therefor is described by reference to the drawings.

Figure 14:
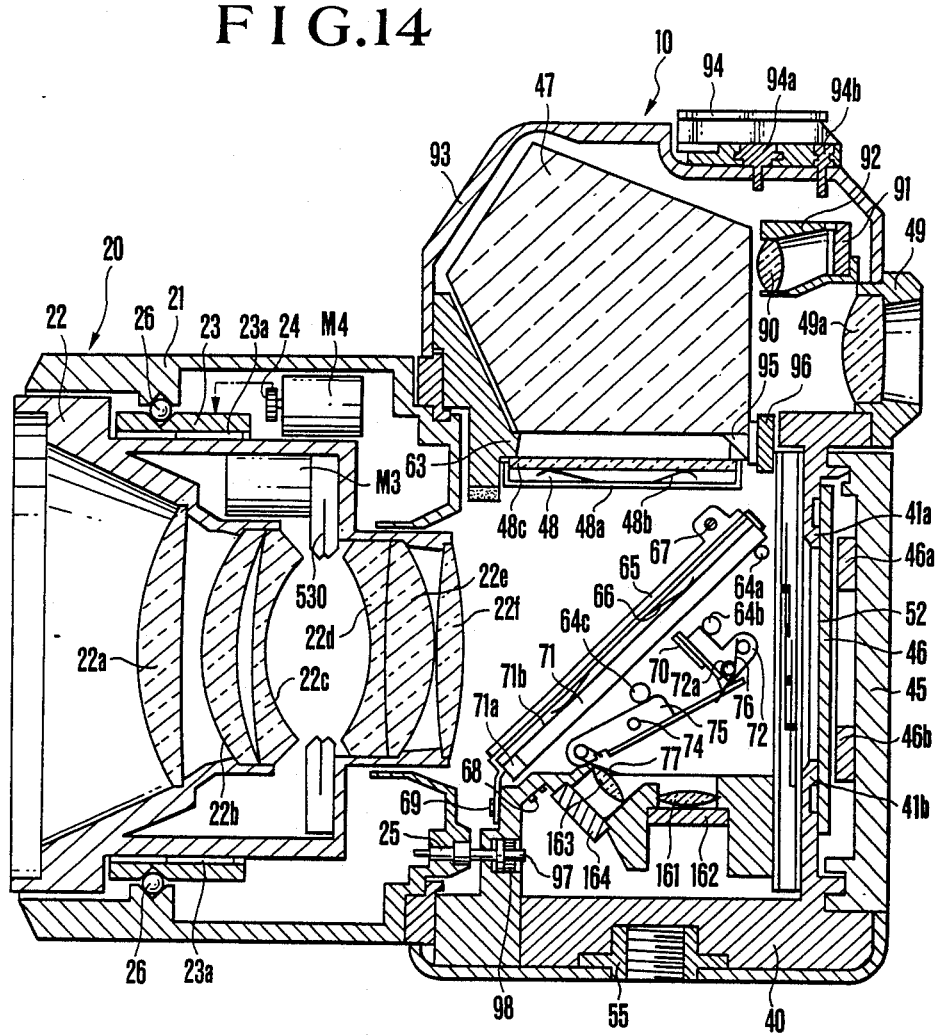
FIG. 14 is a central section view of the camera with the first and second optical elements when in the AF distance measuring position.

FIG. 14 is a longitudinal section view of the single-lens reflex camera embodying the present invention in an operative position where the submirror as the second optical element is up (to measure the object distance for AF). The camera body 40 has upper and lower rails 41a and 41b governing the regulation of position of the film 52 in cooperation with a pressing plate 46. A structural body 63 is formed in unison with the mirror box, and fixedly carries a finder optical system including a pentagonal roof type prism 47e and a focusing screen 48c, a spring 48b urging the screen 48c upward, and a frame 48a for a focusing screen unit 48 in their adjusted positions. A female screw 55 for a tripod is fixedly mounted in the bottom panel of the camera body 40. A back cover 45 is to air tightly hold the film 52. Leaf springs 46a and 46b urge the pressing plate 46 against the surfaces of rails 41a and 41b. An eyepiece lens 49a is fixedly mounted in a frame 49. A light metering lens 90 conducts light to a light metering sensor 91 and is fixedly mounted together with the light metering sensor 91 to a light metering sensor holder 92 in proper positional relationship. An upper cover 93 protects the upper portion of the camera and fixedly carries a strobe shoe 94 having a sync contact 94a known to those skilled in the art and signal contacts, though only one is shown, for transmitting various signals between the camera and a flash device attached thereto. A prism 95 for finder display is arranged underneath the pentagonal prism 47 so that the display content of a display element 96 for displaying finder information is displayed below the field of view of the finder when looked from the eyepiece frame 49. Contacts 97 through which the camera and the lens communicate of information with each other and the electric power is supplied from the camera to the lens side, are urged toward the lens side by springs 98, (though only one is expressed, it actually is plural in number). A pair of fixed pins 64a are fixedly mounted on either of the right and left side walls of the mirror box. A half-reflection fixed mirror 71b as the beam splitter element is mounted on a frame 71a in spread fashion to form the first optical element 71. The first optical element 71 is treated by vacuum evaporation so that the light passing through the optical system 22a–22f of the photographic lens is split to the finder optical system (or to the pentagonal prism side) and the photographic system (or the film side) at a predetermined ratio (of, for example, 60:40). A retaining frame 65 has a spring 66 urging the first optical element 71 to a predetermined position and is supported to be able to swing about pivot pins 67 fixedly mounted on the mirror box 60. The angular position of the first optical element 71 is adjusted to about 45 degrees with the optical axis of the lens by a screw 68. A screw fastener 69 acts on the retaining frame 65 urging the first optical element 71 in fixedly secured relation. The light reflected from the second optical element 70 is conducted by a lens 161 to an AF sensor unit 162. When in making a flash exposure, the light reflected from the film 52 is conducted by a lens 163 to a sensor 164 for TTL light control. The submirror drive plate 75 is urged by a return spring 77 to turn in the counterclockwise direction toward a stationary pin 64b fixedly mounted on the mirror box 60. When abutting on the pin 64b, the plate 75 takes a predetermined angular position. A submirror carrier plate 72 also is urged by a spring 76 acting between the submirror carrier plate 72 and the submirror drive plate 75 to turn always in the clockwise direction toward a stationary pin 64b fixedly mounted to the mirror box 60. When measuring the distance for AF, the submirror carrier plate 72 abuts on the stationary pin 64b, thus being regulated to a predetermined angular position. Reference numeral 70 denotes a total-reflection mirror for AF distance measurement as the second optical element, fixedly mounted on the carrier plate 72. The carrier plate 72 is rotatably mounted about a pin 72a on the submirror drive plate 75.

A known interchangeable lens 20 for the AF single-lens reflex camera is equipped, of course, with the AF-manual changeover mechanism for allowing the user to select either of AF mode and manual focusing mode which latter is operated by the external actuator, in a space between transmission members 23 and 24, and has an electrical switch also, which is operatively connected to that AF-manual changeover mechanism. Connectors 25, though only one of which is shown, on the lens side when in contact with connectors 97 on the camera side enable the camera and the lens to communicate on information with each other and the electric power to be supplied from the camera to the lens side. A bearing 26 is used to smoothly rotate a lens carrier 54 on which the optical system 22a–22f relative to the transmission member 23. The transmission member 23 has a helicoid 23a, or is a helicoid member to which the output of a motor M4 is transmitted through a pinion gear 24, a speed-reduction mechanism (not shown) and the AF-manual changeover mechanism. Reference character M3 denotes a stepping motor as the actuator of the motor-driven diaphragm mechanism 500 of FIG. 13.

Figure 15:
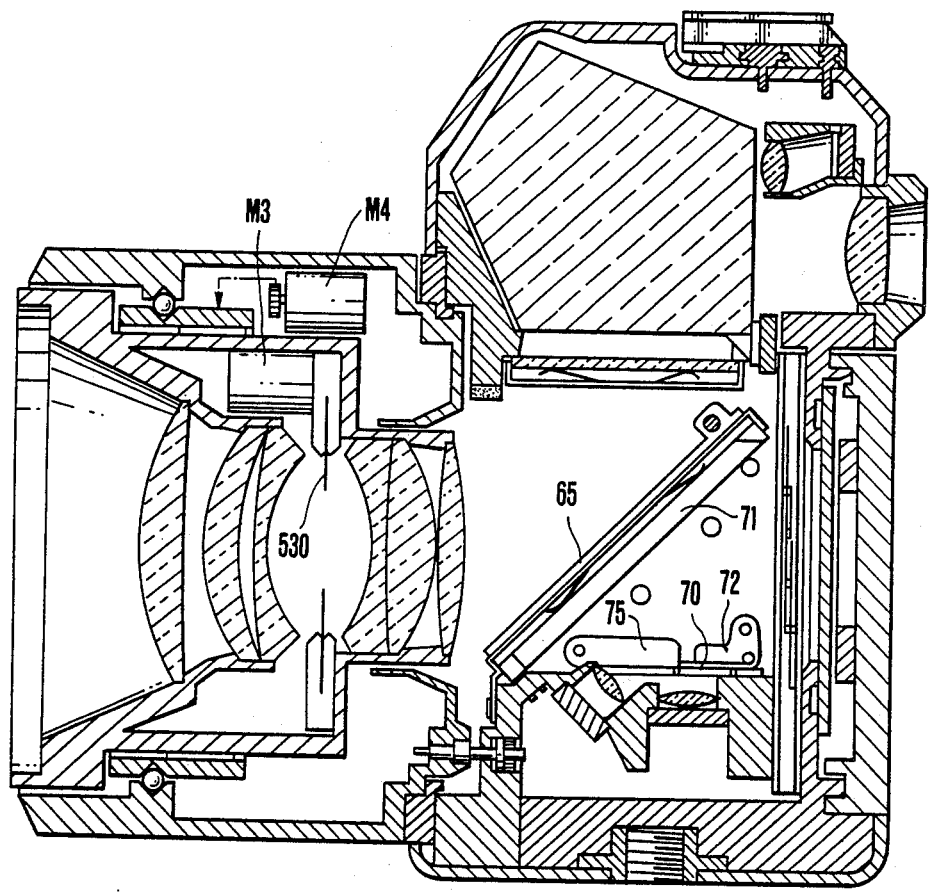
FIG. 15 is a central section view of the camera with the first and second optical elements and the motor-driven diaphragm mechanism when in the ready-to-release position.
Figure 16:
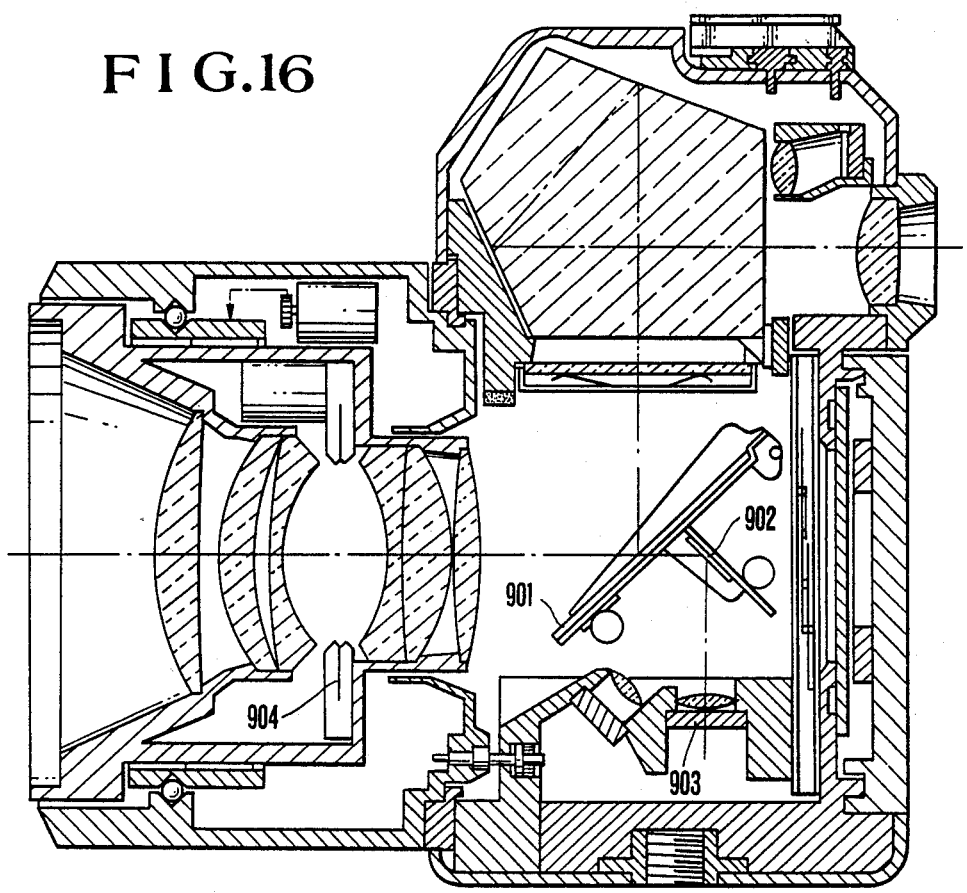
FIG. 16 is a central section view of the conventional camera with the first and second optical elements when in the AF distance measuring position.
Figure 17:
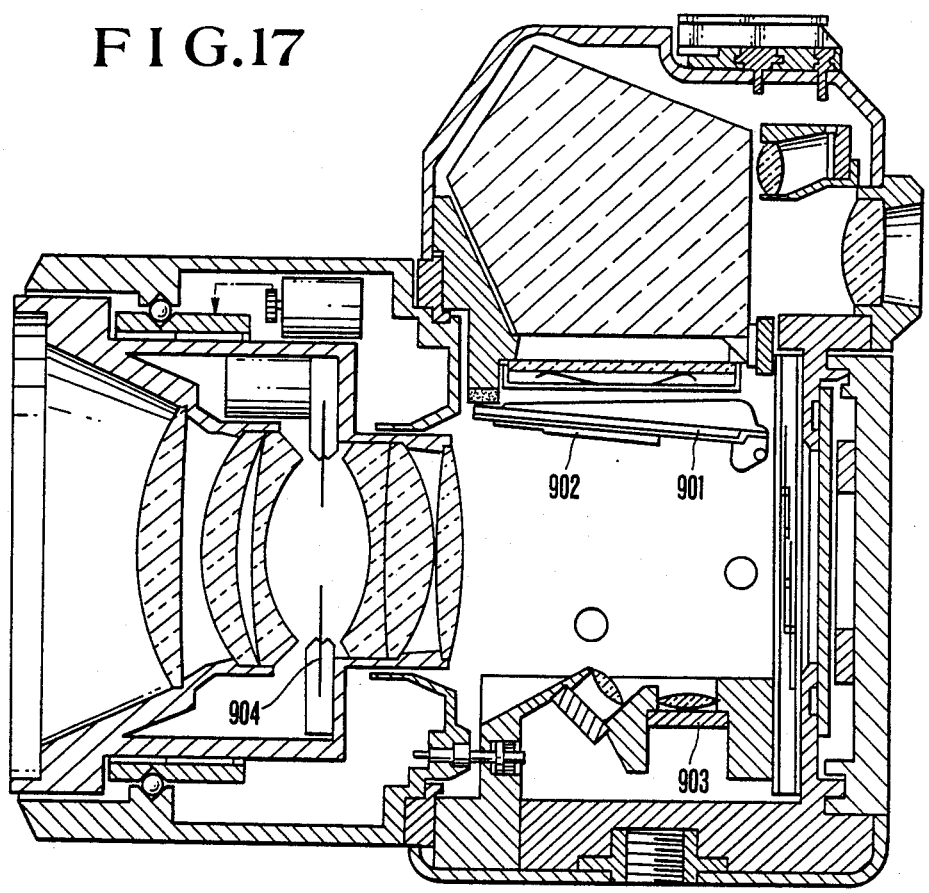
FIG. 17 is a central section view of the conventional camera with the first and second optical elements and the motor-driven diaphragm mechanism during the time between after the shutter was ready to release and when running of the shutter leading curtain has been completed.

FIG. 15 shows the change of the position of the second optical element and the aperture size adjusted position of the lens as the camera has moved from the AF distance measuring state of FIG. 14 to the exposure preparing state.

Next, the operation of from FIG. 14 to FIG. 15 is described. In the state of FIG. 14, on the first stroke of the release button, the output of the AF sensor 162 is applied to a publicly known AF computing circuit for calculating the degree of defocus. Depending on the computation result, a drive signal is given to the AF motor M4 to effect focusing. Also, based on the output of the light metering sensor 91, the control values for the shutter and the diaphragm are determined by a publicly known light metering circuit. When the light metering computation ends, the motor M1 of FIG. 2 is supplied with current, and the submirror drive lever 130 is turned counterclockwise, causing the submirror drive plate 75 to turn clockwise, which in turn causes the submirror carrier plate 72 to turn counterclockwise by means of the cam (not shown) provided in the mirror box 60. Thus, the second optical element 70 is moved downward to clear the photographic optical path. When 15 (mS) from the start of current supply to the motor M1 has passed, the stepping motor M3 is supplied with current, so the diaphragm blades 530 are closed down to the aperture value based on the measure light value. When the motor M1 has rotated a predetermined angle, the current supply to the motor M1 is cut off, and the camera control circuit waits for an input signal (release signal) from the closed second switch by the second stroke of the release button (in the ready-to-expose state of FIG. 15). From this state, when the second switch is closed, the shutter immediately comes into the running state. Therefore, the necessary time from the input of the second switch to the start of opening of the shutter (or the release time lag) is reduced to only few (mS) which are necessary to accommodate the response delay of the shutter-magnet and to process the signal through the electric control circuit. The reason for the delay of the start of current supply to the stepping motor M3 from the start of current supply to the motor M1 by 15 (mS) is that the rush current of the motor M1 would otherwise overlap the current supply to the stepping motor M3, so that the stepping motor M3 is avoided from falling in disorder.

Next, a practical example of the circuit for controlling all the above-described mechanisms is described by reference to the drawings.

Figure 9:
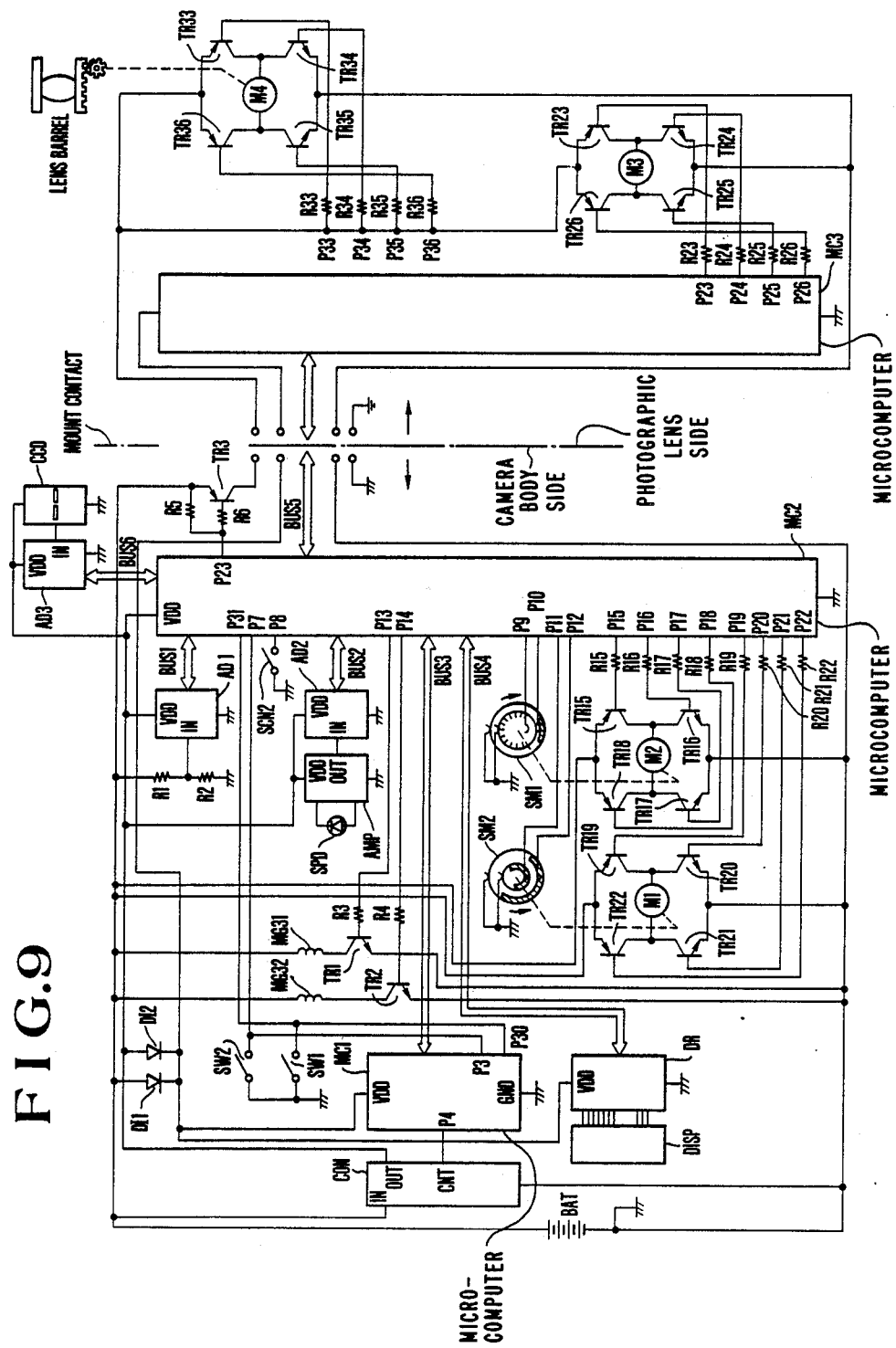
FIG. 9 is a diagram of a circuit for controlling the operation of each mechanism.

FIG. 9 is an electric circuit diagram illustrating the whole construction of the control circuit of the camera. In FIG. 9, an electric power source or battery BAT is connected through a DC/DC converter CON to a microcomputer MC1. The DC/DC converter CON is supplied at an input terminal IN with an unstable voltage ranging from 4 to 6 volts from the battery BAT and converts it to a stable voltage of 5 volts which is produced at an output terminal OUT thereof. It is to be noted that the DC/DC converter CON, when its input terminal CNT is receiving a signal of high level, produces a voltage output of 5 volts, or when receiving a signal of low level, stops the voltage converting operation so that a voltage of 0 volt is produced. The control input terminal CNT of the DC/DC converter CON is connected to an output terminal P4 of the microcomputer MC1 so that its operation is controlled by the microcomputer MC1.

Another microcomputer MC2 capable of high speed computation communicates with an A/D converter AD1 through a bus line BUS1. Resistors R1 and R2 are connected in series to each other so as to divide the voltage of the battery BAT, and its output is applied to an input terminal IN of the A/D converter AD1. The A/D converter AD1 converts this voltage to digital form. The converted value is sent through the bus line BUS1 to the microcomputer MC2.

A silicon photodiode SPD for measuring the external light luminance (the luminance of the light coming from an object to be photographed and entering through the photographic lens 20) produces an output which is then amplified and temperature-compensated by an amplifier AMP. The output of the amplifier AMP is converted to digital form by an A/D converter AD2. For this purpose, an output terminal OUT of the amplifier AMP is connected to an input terminal IN of the A/D converter AD2. The A/D converter AD2 communicates with the microcomputer MC2 through a bus line BUS2. The A/D converter AD2 sends the measured light value through the bus line BUS2 to the microcomputer MC2.

A line sensor CCD for use in automatic focusing is constructed from a commonly available CCD. An A/D converter AD3 A/D-converts the output from the CCD. The image signal in analog form obtained from the CCD is converted to digital value. The A/D converter AD3 communicates with the microcomputer MC2 through a bus line BUS6. The A/D converter AD3 sends the image signal through the bus line BUS6 to the microcomputer MC2.

The A/D converters AD1, AD2 and AD3, the amplifier AMP, the line sensor CCD and the microcomputer MC2 are supplied with electric power in the form of 5V stable voltage produced from the DC/DC converter CON, when their circuit operation is performed. Therefore, when the DC/DC converter CON is stopping the voltage converting operation, the circuit is rendered inoperative.

A switch SW1 is responsive to the first stroke of the release button 12, and is normally in off state. When the release button 12 is pushed to the first stroke, the switch SW1 turns on.

Another switch SW2 is responsive to the second stroke of the release button 12, and is normally in off state. When the release button is pushed until the second stroke, the switch SW2 turns on.

Another switch SCN2 is responsive to the trailing curtain of the shutter of the camera and turns on when the running of the trailing curtain of the shutter ends.

The switches SW1 and SW2 are connected respectively to input ports P3 and P30 of the microcomputer MC1 and input ports P7 and P31 of the microcomputer MC2, so that both microcomputers MC1 and MC2 can detect independently of each other the ON or OFF positions of these switches. The switch SCN2 is connected to an input port P8 of the microcomputer M2 so that only the microcomputer MC2 can detect the ON or OFF position of this switch.

A bus line BUS3 is used to communicate between the microcomputer MC1 and the microcomputer MC2. A display DISP using, for example, liquid crystal, is to display the computed shutter time and aperture values by the measured light value and the operating state of the camera. A display driver DR in the form of an integrated circuit (hereinafter referred to as IC) is connected to the display DISP to drive the display DISP to display. The display driver IC DR is connected to the microcomputer MC2 through a bus line BUS4, and display information is sent from the microcomputer MC2. Based on this data, the display driver IC DR drives the display DISP.

The microcomputer MC1 and the display driver IC DR are supplied with electric power from either the battery BAT or the DC/DC converter CON through diodes D11 and D12 respectively. Therefore, so long as the electrical power source or battery BAT is loaded, the circuit is always operating.

A coil MG31 in electromagnet form (corresponding to the coil 383 of FIG. 7) is to start the leading curtain of the shutter. Another coil MG32 in electromagnet form (corresponding to the coil 389 of FIG. 7) is to start the trailing curtain of the shutter.

The coil MG31 is connected to the collector of a transistor TR1, and the coil MG32 is connected to the collector of a transistor TR2. The base of the transistor TR1 is connected through a base resistor R3 to an output port P13 of the microcomputer MC2. Also, likewise the base of the transistor TR2 is connected through a base resistor R4 to an output port P14 of the microcomputer MC2. The shutter time can be controlled by outputting signals from the output ports P13 and P14 of the microcomputer MC2.

Also, the coils MG31 and MG32 are used as the actual load resistors when the voltage is checked under the condition that the shutter is latched so as not to run. Even this control is possible for the microcomputer MC2 to perform by outputting signals from the output ports P13 and P14.

The second motor M2 is for use in winding up the film. One of the two ends of winding of the second motor M2 is connected to the collectors of a PNP transistor TR15 and an NPN transistor TR16, and the other end is likewise connected to the collectors of a PNP transistor TR18 and an NPN transistor TR17. The bases of the transistors TR15, TR16, TR17 and TR18 are connected through respective base resistors R15, R16, R17 and R18 to output ports P15, P16, P17 and P18 of the microcomputer MC2 respectively.

The emitters of the transistors TR15 and TR18 are connected to the (+) side of the battery BAT, and the emitters of the transistors TR16 and TR17 are connected to the (−) side.

The microcomputer MC2 can operate the second motor M2 to rotate in the forward or reverse direction freely by outputting signals from the output ports P15, P16, P17 and P18. For example, by outputting signals of high level from the output ports P15 and P16 and outputting signals of low level from the output ports P17 and P18, the transistors TR16 and TR18 are turned on, and the transistors TR15 and TR17 are turned off. As a result, the current flows from the left to the right, so that the second motor M2 rotates in the forward direction.

Also, conversely by outputting signals of low level from the output ports P15 and P16 and outputting signals of high level at the output ports P17 and P18, the transistors TR16 and TR18 are turned off and the transistors TR15 and TR17 are turned on, current flowing from the right to the left, so that the second motor M2 rotates in the reverse direction.

The first motor M1 is for use in charging the shutter and driving the mirror. One of the two ends of winding of the motor M1 is connected to the collectors of a PNP transistor TR19 and an NPN transistor TR20, and the other end is connected to the collectors of a PNP transistor TR22 and an NPN transistor TR21. The bases of the transistors TR19, TR20, TR21 and TR22 are connected through respective base resistors R19, R20, R21 and R22 to output ports P19, P20, P21 and P22 of the microcomputer MC2.

The emitters of the transistors TR19 and TR22 are connected to the (+) side of the battery BAT, and the emitters of the transistors TR20 and TR21 are connected to the (−) side.

The microcomputer MC2, likewise control of the second motor M2, can operate the first motor M1 to rotate in the forward or reverse direction freely by outputting signals from the output ports P19, P20, P21 and P22.

A switch SM1 is in the form of electrically conductive patterns depicted on a rotary substrate disc. The rotary disc switch SM1 rotates in response to rotation of a sprocket 402 of the film wind drive mechanism 400. A signal from the switch SM1 is connected to input ports P9 and P10 of the microcomputer MC2, so that the microcomputer MC2 can detect an ON-OFF signal of the patterns on the rotary disc as the second motor M2 rotates. Likewise, another switch SM2 is in the form of a brush slider switch which rotates in response to rotation of that cam which performs vertical movement of the mirror and charging of the shutter (corresponding to the switch comprising the brush 122 and the signal substrate 160 shown in FIG. 3(a) to FIG. 4(b)). The signal from the switch SM2 is connected to input ports P11 and P12 of the microcomputer MC2, so that the second microcomputer MC2 can detect an ON-OFF signal as the first motor M1 rotates in the one direction.

A switching transistor TR3 is to change over between the electric power supply and the supply stop of the third motor M3 for driving the diaphragm of the lens side through the mount connectors (the contact type connectors arranged in both of the camera mount portion of the camera body and the lens mount portion of the photographic lens). The base of the transistor TR3 is connected through a base resistor TR6 to an output port P27 of the microcomputer MC2. As a result, the microcomputer MC2 can control the power supply to the third motor M3 for driving the diaphragm of the lens side.

A resistor R5 is connected to the microcomputer MC2 in order to leave the transistor TR3 in OFF state when the power supply is being stopped in the off state of the DC/DC converter CON. The resistor R5 is provided in between the (+) side terminal of the battery BAT through the resistor T6 and the base of the transistor TR3.

A microcomputer MC3 is provided inside the photographic lens attachable to, or detachable from, the camera, and a third motor M3 is also provided within the lens. By this third motor M3, the diaphragm blades (see FIG. 8) are opened and closed.

One of the two ends of winding of the third motor M3 is connected to the collectors of a PNP transistor TR23 and an PNP transistor TR24, and the other end is likewise connected to the collectors of a PNP transistor TR26 and an NPN transistor TR25. The bases of the transistors TR23, TR24, TR25 and TR26 are connected through respective base resistors R23, R24, R25 and R26 to output ports P23, P24, P25 and P26 of the microcomputer MC3.

The emitters of the transistors TR23 and TR26 are connected to the (+) side of the battery BAT through the mount connectors in between the camera and the lens and the switching transistor TR3, and the emitters of the transistors TR24 and TR25 are connected also through the mount connectors in between the camera and the lens to the (−) side of the battery BAT.

The microcomputer MC3 can operate the third motor M3 to rotate in the forward or reverse direction freely by outputting signals from the output ports P23, P24, P25 and P26.

A bus line BUS5 is used to communicate between the microcomputer MC2 of the camera side and the microcomputer MC3 of the lens side through the mount connectors. The microcomputer MC2 of the camera side, with the help of this bus line BUS5, can command the microcomputer MC3 of the lens side to drive the third motor M3 so as to close the diaphragm blades down to the predetermined position, or to reverse the driving of the third motor M3 so as to return the diaphragm blades to the full open aperture position.

A fourth motor M4 is provided inside the lens. By this fourth motor M4, the barrel of the lens repeats the forward or rearward moving operation, thus performing focus adjustment.

One of the two ends of winding of the fourth motor M4 is connected to the collectors of a PNP transistor TR33 and an NPN transistor TR34, and the other end is likewise connected to the collectors of a PNP transistor TR36 and an NPN transistors TR35. The bases of the transistors TR33, TR34, TR35 and TR36 are connected through respective resistors R33, R34, R35 and R36 to output ports P33, P34, P35 and P36 of the microcomputer MC3.

The emitters of the transistors TR33 and TR36 are connected through the mount connectors in between the camera and the lens and the switching transistor TR3 to the (+) side of the battery BAT, and the emitters of the transistors TR34 and TR35 are connected also through the mount connectors in between the camera and the lens to the (−) side of the battery BAT.

The microcomputer MC3 can operate the fourth motor M4 to rotate in the forward or reverse direction freely by outputting signals from the output ports P23, P24, P25 and P26.

The microcomputer MC2 of the camera side can, with the help of the bus line BUS5, command the microcomputer MC3 of the lens side to drive the fourth motor M4 so as to move the lens barrel to the predetermined position.

Also, the microcomputer MC3 is supplied with its electric power through the mount connectors from the battery BAT or the DC/DC converter CON through diodes D11 and D12 respectively.

The operation of the thus-networked control circuit of the camera is described on the basis of the flowcharts.

Figure 10:
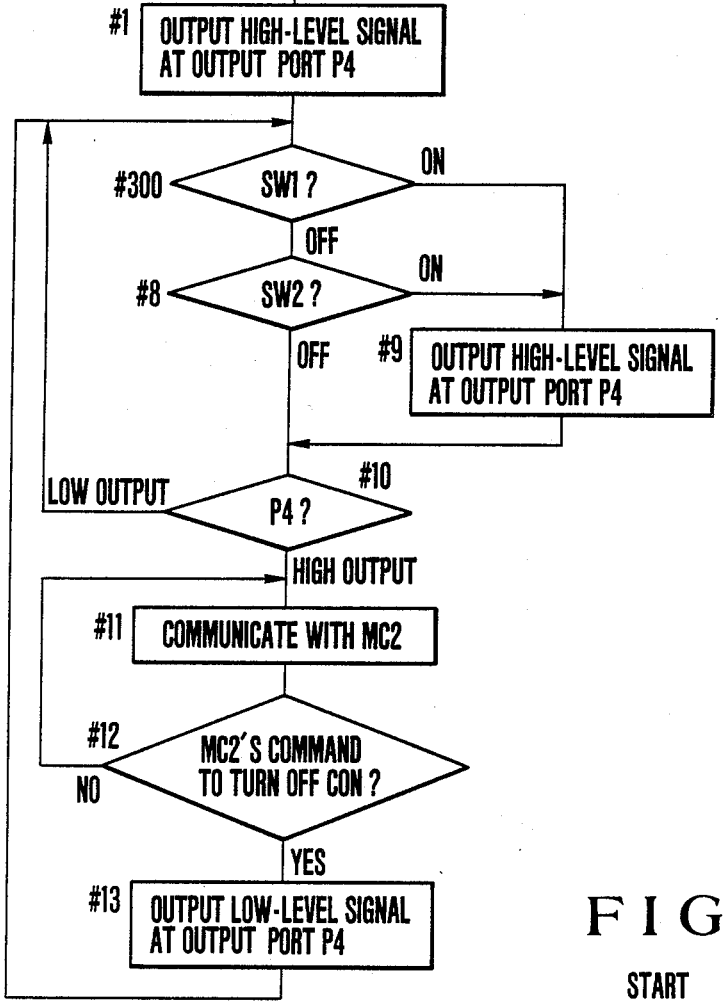
FIG. 10 is a flowchart for the operation of the circuit of FIG. 9.

FIG. 10 is a flowchart for the operation of the microcomputer MC1.

When the electric power source or battery BAT is turned on, the microcomputer MC1 is power-on reset and starts to operate at a first step. The subsequent procedure is explained according to the flowchart.

Step #1: A signal of high level is produced at the output port P4, causing the DC/DC converter CON to produce an output in the form of stable voltage of 5 volts which is supplied to the microcomputer MC2, the light metering amplifier AMP and A/D converters AD1 and AD2.

Step #300: The state of the switch SW1 is read in order to check whether or not the release button is pushed to the first stroke.

If the release switch SW1 is on, the program branches to a step #9, and if off, to a step #8.

Step #8: The state of the release switch SW2 is read in order to check whether or not the release button 12 is pushed. If the release switch SW2 is on, the program branches to the step #9, and if off, to a step #10.

Step #9: Similarly to the step #1, the DC/DC converter CON is turned on.

Step #10: Whether or not now the DC/DC converter CON is on is discriminated. If the DC/DC converter CON is off, the program returns to the step #300. After this, the reading of the switches is repeated until the open or closed state of the back cover changes, or the switch SRW responsive to the rewind button 14, or the release switch SW2 is turned on.

Step #11: Communication with the microcomputer MC2 starts and a command from the microcomputer MC2 is received.

Step #12: When the microcomputer MC2 commands the DC/DC converter CON to turn off, the program advances to a step #13. If the command is not to turn off the DC/DC converter CON, the program returns to the step #11 and waits for the command of turning off the DC/DC converter CON.

Step #13: A signal of low level is produced at the output port P4, causing the DC/DC converter CON to turn off. Thus, the DC/DC converter CON stops outputting the stable voltage of 5 volts.

The foregoing is the operation of the microcomputer MC1. As is understandable from this flowchart, the microcomputer MC1 activates the DC/DC converter CON when the electric power source is turned on and when the release switches SW1 and SW2 are turned on, supplying electric power to the microcomputer MC2, the light metering amplifier AMP and the A/D converters AD1 and AD2. After the start of the supply, the DC/DC converter CON is left in ON state until the "off" command for the DC/DC converter CON is received from the microcomputer MC2. At a time when the "off" command for the DC/DC converter CON has been received from the microcomputer MC2, the DC/DC converter CON is turned off. Such an operation is performed by the microcomputer MC1.

Next, the operation of the microcomputer MC2 that follows the turning on of the DC/DC converter CON is described. It is to be noted that the reason for the arrangement that whilst the microcomputer MC1 is permitted to always operate from the time of turning-on the electric power source BAT, the microcomputer MC2 starts to operate when the DC/DC converter CON turns on and the electric power supply is allowed to occur only as long as the DC/DC converter CON is on, is that the microcomputer MC1 is assumed to be a low-speed one of the low electric energy consumption type because its task is only to detect the switches, and the microcomputer MC2 is assumed to be a one capable of high-speed processing with large consumption of electric power.

Figure 11A:
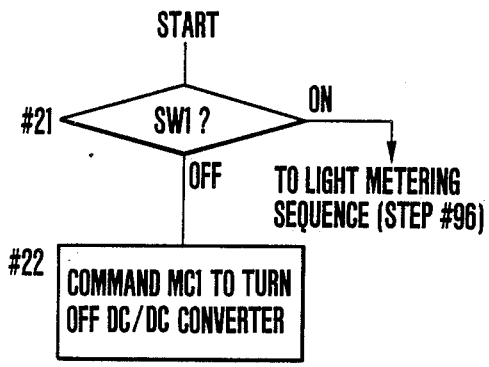
FIGS. 11(a), 11(b) and 11(c) are flowcharts for the operation of the circuit of FIG. 9.
Figure 11B:
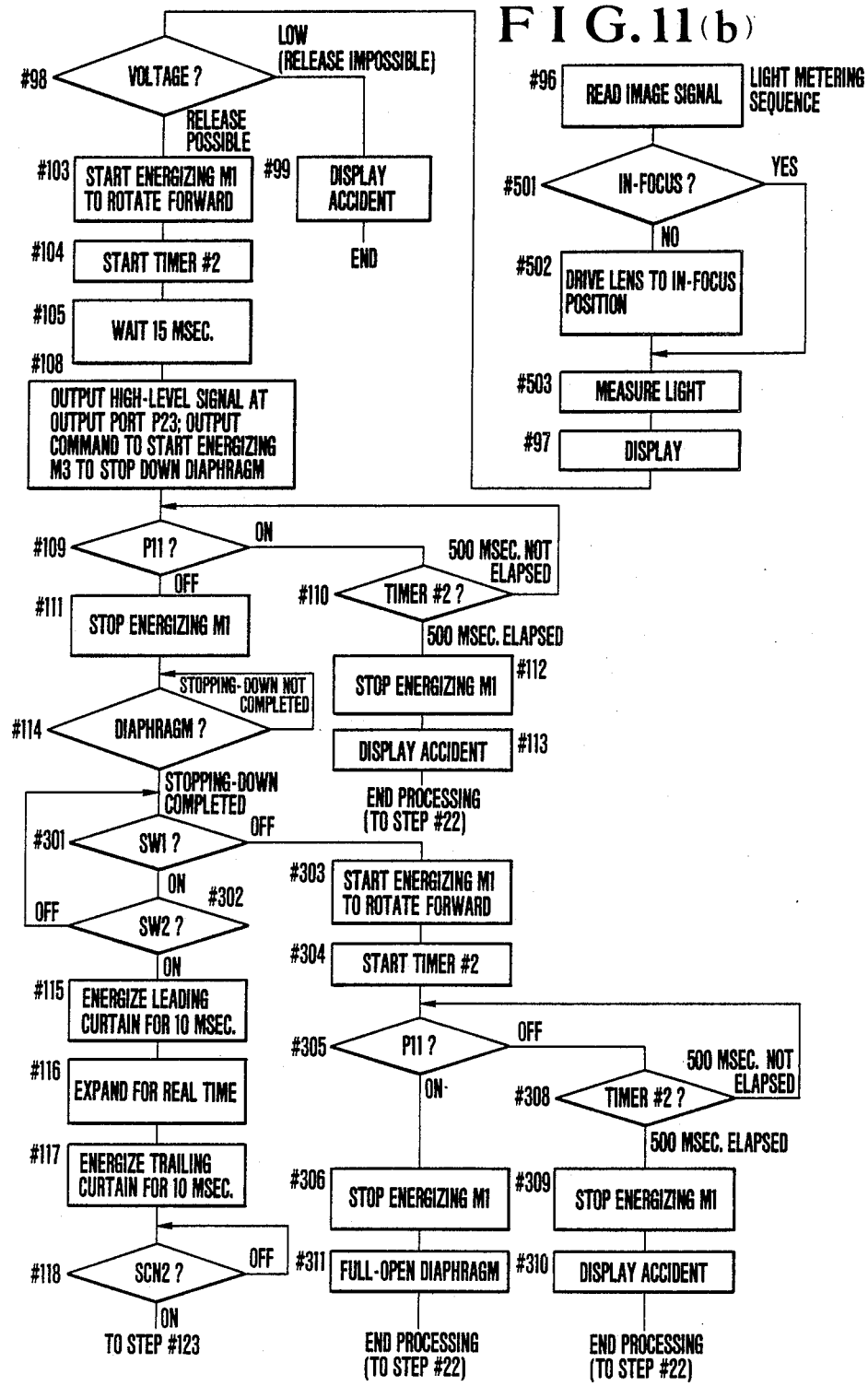
Figure 11C:
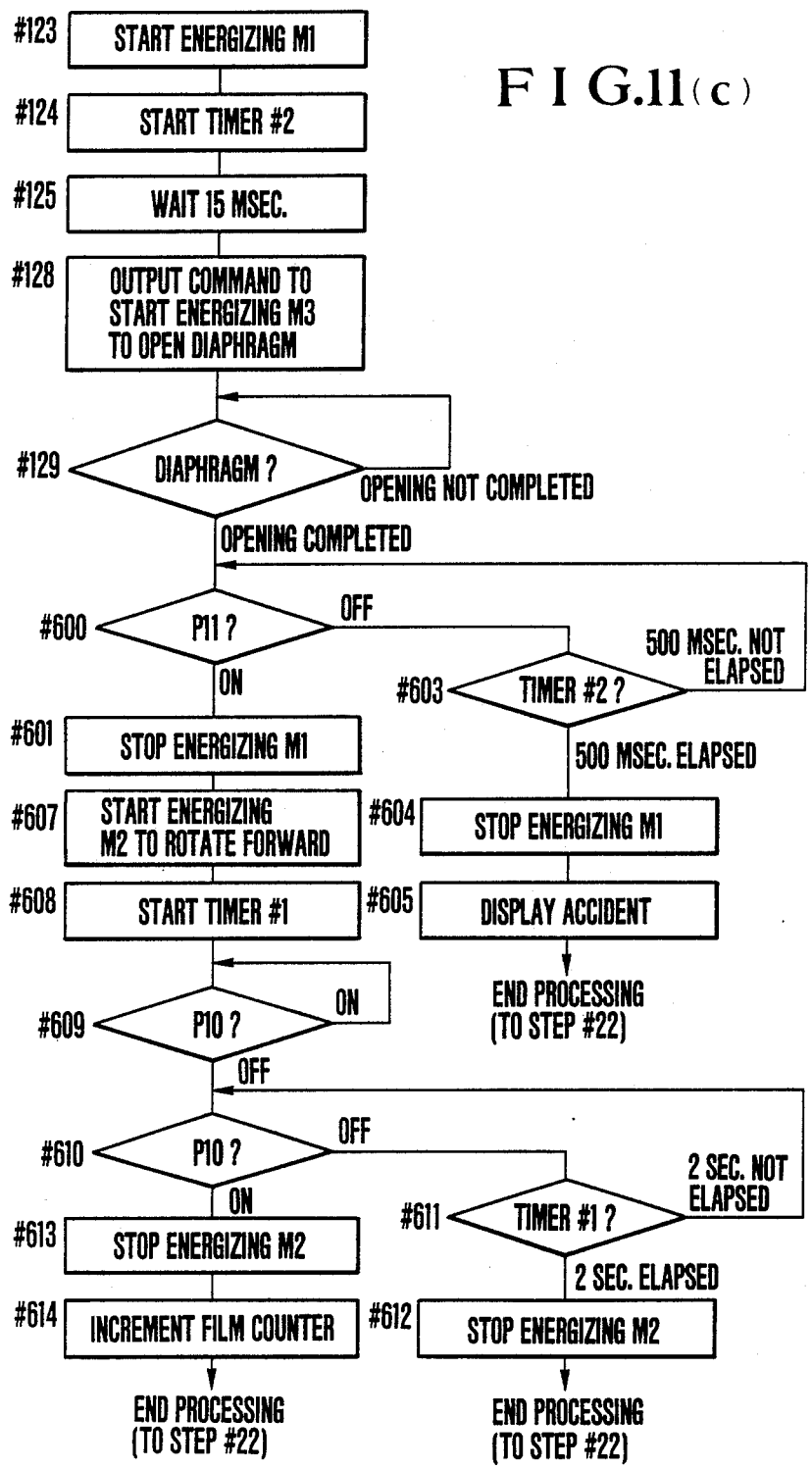

FIGS. 11(a), 11(b) and 11(c) are flowcharts for the process of after the electric power supply to the microcomputer MC2.

The following explanation is made according to the flowcharts.

Step #21: The state of the release switch SW1 is read in order to check whether or not the release button 12 is pushed to the first stroke. If the release button 12 is not pushed to the first stroke, the program advances to a step #22. If the release button 12 is pushed to the first stroke, the program branches to a light metering sequence of FIG. 11(b).

Step #22: A treatment for ending the operation is carried out. A command is given the microcomputer MC1 to stop the operation of the DC/DC converter CON. After that, because the microcomputer MC1 turns off the DC/DC converter CON, the microcomputer MC2 is cut off from the electric power source. Hence the treatment ends.

Next, the light metering sequence of FIG. 11(b) is described.

The light metering sequence performs the treatment for the time of the release button pushed to the first stroke as has been described in connection with the process performed after the electric power supply.

Step #96: Communication with the A/D converter AD3 is performed, and the image signal data is read in.

Step #501: Detection for in-focus position is performed based on the data of the read image signal. If the given position of the lens barrel already coincides with the in-focus position, the program branches to a step #503. If not in focus, the program advances to a step #502.

Step #502: From the data of the image signal, a command of moving the lens barrel is given to the microcomputer MC3 of the lens side.

Step #503: Communication with the A/D converter AD3 is performed and the AD converted value of the light measurement is read in.

Step #97: Based on the AD converted value of the light measurement, the shutter speed value and the aperture value are sent to the display driver IC DR.

Step #98: The voltage checking is carried out. As the voltage is checked, if the voltage is below a satisfactory level, the program advances to a step #99. If the voltage is high enough to release, the program branches to a step #103. The voltage checking here is to examine whether or not the release is possible to do. For example, when the voltage value $V_0$ is $V_0 < 3$ volts, branch to the step #99 occurs. When $V_0 \geqq 3$ volts, branch to the step #103 occurs.

Step #99: Display data is sent to the display driver IC DR, causing it to display a warning that the voltage has dropped.

Step #103: Current supply for forward rotation of the first motor M1 is started to move the submirror down and remove the double light shielding of the shutter.

Step #104: A timer for counting the time for which the first motor M1 is energized is started.

Step #105: 15 milliseconds are waited until the rush current at the start of the current supply disappears.

Step #108: A signal of high level is produced at the output port P23 and the electric power is supplied so that the driving of the third motor M3 for the diaphragm blades of the lens side is possible. After that, the microcomputer MC3 of the lens side is given a command for closing the diaphragm blades of the lens side down to a position of the computed aperture value.

Step #109: The input port P11 is checked. If the downing of the submirror is completed, the program branches to a step #111. If the submirror is not in the fully downed position, the program branches to a step #110.

Step #110: The counter that has been counting the time from the start of energization of the first motor M1 is checked. In the case that 500 milliseconds have passed, the program advances to a step #112. In the case that 500 milliseconds have not passed, the program returns to the step #109 and waits for the completion of downing of the submirror.

Step #112: Because the downing operation of the submirror does not terminate within 500 milliseconds, it is taken as an accident has happened, and the current supply to the first motor M1 is stopped.

Step #113: A display data is outputted to the display driver IC DR to display the occurrence of the accident. The program branches to a step #22 and the treatment ends.

Step #111: since the input port P11 has turned off, because the downing of the submirror has been completed (the double light shielding of the shutter has been removed), the current supply to the first motor M1 is stopped.

Step #114: Communication with the lens microcomputer MC3 is performed and whether or not the diaphragm has stopped down to the predetermined position is conformed. If the diaphragm blades are in the predetermined position, the program advances to a step #301. If the stopping down is not completed, the program returns to the step #114 and waits for the termination of the stopping down of the diaphragm blades 530.

Step #301: To check whether or not the release button is pushed to the first stroke, the switch SW1 is read in. If the release button 12 is pushed to the first stroke, the program branches to a step #302, and if not pushed, to a step #303.

Step #302: To check whether or not the release button 12 is pushed to the second stroke, the switch SW1 is read in.

If the release button 12 is pushed to the second stroke, the program branches to a step #115 in order to start an exposure operation. If the release button 12 is not pushed to the second stroke, the program returns to the step #301 and loops between the step #301 and the step #302 until the release button 12 is fully released from the depression, or further pushed to the second stroke.

Step #303: Because the release button 12 has been fully off, the current supply for the forward rotation of the motor M1 is started in order to return the submirror from the downed state to the normal position for measuring the distance for AF.

Step #304: The timer for counting the time for which the motor M1 is energized is started.

Step #305: The input port P11 is checked. If the upping of the submirror is completed, the program branches to a step #306. If the upping of the submirror is not completed, to a step #308.

Step #308: The timer that has been counting the time from the start of current supply to the motor M1 is checked. In the case when 500 milliseconds have passed, it is judged that the submirror has not upped within the predetermined time and the program branches to a step #309. In the case when 500 milliseconds have not passed yet, the program returns to the step #305 and waits for the end of upping of the submirror.

Step #309: Because the upping operation of the submirror has not been completed within 500 milliseconds, it is judged that an accident has happened, and the current supply to the motor M1 is stopped.

Step #310: The display data is outputted to the display driver IC DR so that the occurrence of the accident is displayed, and the treatment ends. And, after that, the program advances to the step #22.

Step #306: Since the input port P11 turns on, because the upping of the submirror has been completed, the current supply to the motor M1 is stopped.

Step #311: Communication with the lens microcomputer MC3 is performed and a command for returning the diaphragm to the full open aperture position is given. The foregoing results in setting the camera to the initial state. Then, the program returns to the step #22 and the processing comes to an end.

Next, the process from a step #115 onward for the depression of the release button 12 to the second stroke is described.

Step #115: From the input port P13, a signal of high level is outputted for 10 milliseconds to energize the coil 383 of electromagnet for controlling the leading curtain of the shutter, and the leading curtain of the shutter is caused to run. Thereby, an exposure operation of the film is started.

Step #116: A film exposure time is waited.

Step #117: From the output port P14, a signal of high level is produced for 10 millisecond to energize the coil 389 of electromagnet for controlling the trailing curtain of the shutter, and the trailing curtain of the shutter is caused to run. Thereby, the exposure operation of the film ends.

Step #118: Whether the switch SCN2 responsive to the completion of running of the trailing curtain is on or off is discriminated. If off, the program stays in the step #118 and waits for the change of the switch to the "on" state. If on, as it implies that the running of the trailing curtain has been completed, the program branches to a step #123.

Step #123: To move the submirror upward and charge the shutter, current supply for the forward rotation of the first motor M1 is started.

Step #124: A timer #2 for counting the time for which the first motor M1 is energized is started.

Step #125: 15 milliseconds are waited until the rush current at the start of current supply to the first motor M1 disappears.

Step #128: The lens microcomputer MC3 is given a command for returning the diaphragm blades 530 of the lens to the full open aperture position.

Step #129: The lens microcomputer MC3 communicates with the microcomputer MC2 to check whether or not the diaphragm blades have been fully opened. If the diaphragm blades are fully opened, the program advances to a step #600. If the diaphragm blades are not fully opened, the program returns to the step #129 and waits for full opening of the diaphragm.

Step #600: The input port P11 is checked. If the upping of the submirror is completed, the program branches to a step #601. If the upping of the submirror is not yet completed, the program branches to a step #603.

Step #603: The timer that has been counting the time from the start of current supply to the motor M1 is checked. In the case when 500 millisecond has passed, it is judged that the submirror has not upped within the predetermined time, so that the program branches to a step #604. In the case when 500 milliseconds have not passed, the program returns to the step #600 and waits for the end of upping of the submirror.

Step #604: because the upping operation of the submirror has not been completed within 500 milliseconds, it is judged that an accident has happened, and the current supply to the motor M1 is stopped.

Step #605: The display data is outputted to the display driver IC DR so that the occurrence of the accident is displayed and the processing ends.

Step #601: Since the input port P11 is turned on, because the upping of the submirror has been completed, the current supply to the motor M1 is stopped.

Step #607: To transport the film, current supply for forward rotation of the motor M2 is started.

Step #608: The timer for counting the time for which the motor M2 is energized is started.

Step #609: The input port P10 is checked. If off, the program advances to a step #610. So long as it is on, the program returns to the step #609 and waits until off.

The signal at the input port P10, as is responsive to the sprocket, changes to low level at a time when the one-frame transportation of the film has ended. Responsive to the input signal of low level, the microcomputer MC2 stops the operation of the film transportation mechanism. Thus, the film can be advanced through the length of exactly one frame. But, if, from the beginning, the input signal is of low level, as it implies that the low level that occurred at the termination of the preceding cycle of film transportation remains inputted, a treatment for waiting for the change of this signal to high level becomes necessary. The treatment of the step #609 meets with this requirement.

Step #610: Checking of the input port P10 is carried out again. If the signal of low level is inputting, it is regarded as the end of the one-frame transportation and the program branches to a step #613, and if not so, to a step #611.

Step #611: The timer that has been counting the time from the start of current supply to the motor M2 is checked. In the case when more than 2 seconds have passed, it is regarded as the end of filming since the film could no longer be wound up, and the program branches to a step #612.

In the case when 2 seconds have not yet passed, the program returns to the step #610 and waits for the end of the one-frame transportation.

2 seconds mean that in the normal case, this set value of the time space is taken as sufficient for assuring the transportation of the film by one frame.

Step #612: Because the transportation has not been completed within 2 seconds, it is regarded as the film used up to the last frame, and the current supply to the motor M2 is stopped. After that, the program returns to the step #22, thus terminating the processing.

Step #613: Regarding that the film has been wound up right by one frame, the current supply to the motor M2 for transportation is stopped.

Step #614: A counter for memorizing the number of exposed frames of the film is incremented. After that, the program returns to the step #22, terminating the processing. The foregoing constitutes the flow of the sequence that simultaneously carries out the releasing of the shutter, the transporting of the film, the charging of the shutter and the moving of the submirror.

Next, the flowchart for the lens microcomputer MC3 is explained.

Figure 12:
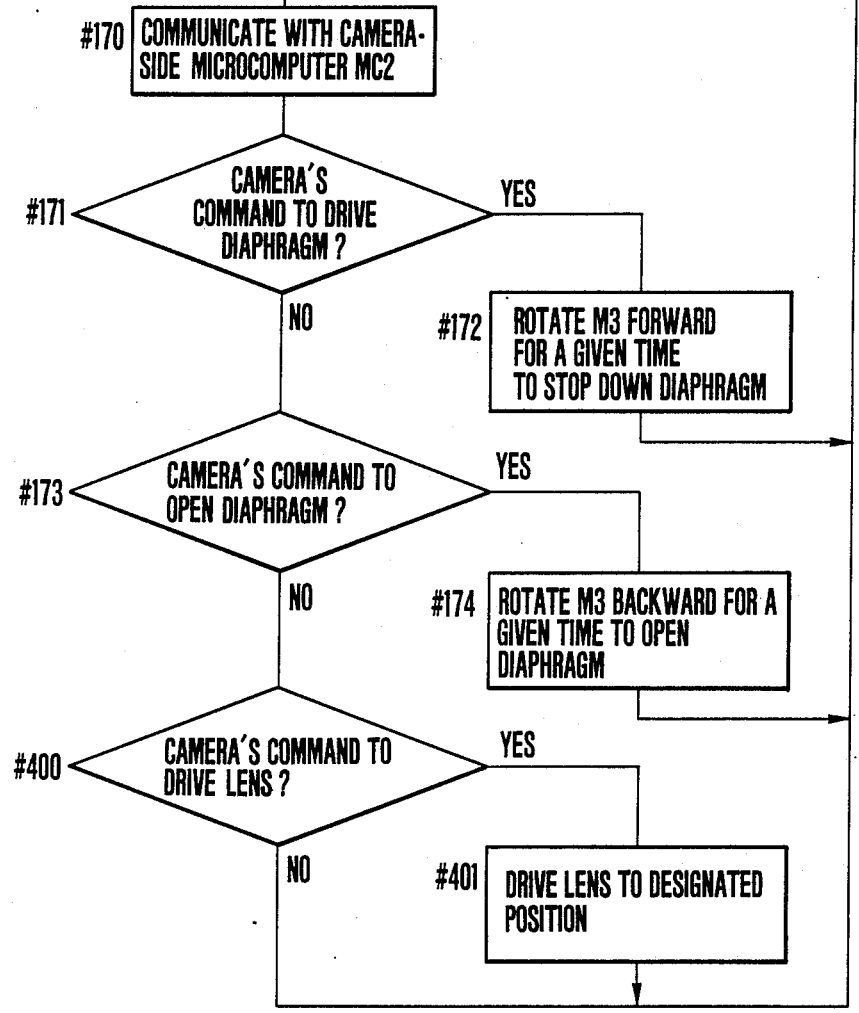
FIG. 12 is a flowchart for the operation of the circuit of FIG. 9.

FIG. 12 is a flowchart for the microcomputer MC3 of the lens side.

Step #170: It communicates with the microcomputer MC2 of the camera side.

Step #171: Whether or not the result of the communication with the camera-side microcomputer MC2 is the diaphragm drive command from the camera side is tested. If it is determined to be the diaphragm drive command, the program branches to a step #172, and if not so, to a step #173.

Step #172: The third motor M3 for driving the diaphragm blades is supplied with a current flowing in the direction for the forward rotation (or the counterclockwise direction in FIG. 8) and the diaphragm is closed down to the predetermined position. Since the aperture value has been sent from the camera side at the time of communicating, no longer a time is necessary than the corresponding time to the aperture value for which the current supply is to continue. Also, as the third motor M3, use may be made of a stepping motor or the like. For this case, the operation of the third motor M3 is controlled in accordance with the number of outputted drive pulses.

Step #173: Whether or not the result of the communication with the camera-side microcomputer is the command for fully opening the diaphragm is tested. If it is determined to be the diaphragm full-open command, the program branches to a step #174, and if not so, to a step #400.

Step #174: The third motor M3 for driving the diaphragm blades is supplied with a current flowing in a direction for the reverse rotation (or the clockwise rotation in FIG. 8) for a predetermined time, thus fully opening the diaphragm. After that, the program returns to the step #170 and waits for a command from the camera-side microcomputer MC2.

Step #400: Whether or not the result of the communication with the microcomputer MC2 of the camera side is a command for driving the lens barrel is tested. If it is determined to be the lens barrel drive command, the program branches to a step #401. If not so, the program returns to the step #170 and waits for the next command from the microcomputer MC2 of the camera side.

Step #401: The fourth motor M4 for driving the lens barrel is driven to the designated position. After that, the program returns to a step #170 and waits for a command from the microcomputer MC2.

The foregoing constitutes the flowchart for the lens microcomputer MC3.

As has been described above, according to the invention, in the embodiment of an AF single-lens reflex camera, it is at a time when the distance measuring operation has terminated that the aperture adjustment and the retracting movement of the submirror for distance measurement are done prior to actuating a shutter release, thereby giving an advantage that when a shutter release is actuated, the exposure operation is started almost without a release time lag. Also, the present invention is to provide a reflex camera in which the main mirror for reflecting light entering through the photographic lens to the finder optical system is constructed in the form of a half-reflection mirror and arranged in the fixed relation to the finder optical system, since the passed light is used for exposure, thereby giving an additional advantage that, even when the exposure preparing operation such as closing down the diaphragm and flipping down the submirror has been done early, no problem is given to the photographing, because the photographer looking through the finder can continue observing the object being photographed.

What is claimed is:

1. A camera having focus detecting means, comprising:
   (a) an optical element for splitting an object light beam at a predetermined ratio to a finder optical system and a photographic system; and
   (b) control means, responsive to termination of an operation of said focus detecting means, for controlling a diaphragm regardless of whether or not a photographing operation is started.

2. A camera according to claim 1, wherein said optical element is a fixed half-reflection mirror member arranged in a photographic optical path.

3. A camera according to claim 1, further comprising:
   a first switch for generating a start signal of an operation of said focus detecting means; and
   a second switch for generating a start signal of said photographing operation,
   wherein the control of said diaphragm is, despite of the generation of said start signal from said second switch, carried out after the operation of said focus detecting means based on said start signal from said first switch.

4. A camera according to claim 1, further comprising:
   a light metering sensor arranged in said finder optical system.

5. A camera body to which an interchangeable lens having a built-in diaphragm is detachably attached, comprising:
   (a) focus detecting means;
   (b) an optical element for splitting an object light beam at a predetermined ratio to a finder optical system and to a photographic system; and
   (c) a control circuit, responsive to termination of an operation of said focus detecting means, for supplying a control signal for said diaphragm to said interchangeable lens regardless of whether or not a photographing operation is started.

6. A camera body according to claim 5, wherein said optical element is a fixed half-reflection mirror member arranged in a photographic optical path.

7. A camera body according to claim 5, further comprising:
   a first switch for generating a start signal of the operation of said focus detecting means; and
   a second switch for generating a start signal of said photographing operation,
   wherein the supply of said control signal for said diaphragm is, despite of the generation of said start signal from said second switch, carried out after the termination of the operation of said focus detecting means based on said start signal from said first switch.

8. A camera body according to claim 5, further comprising:
   a light metering sensor arranged in said finder optical system.

9. A camera according to claim 1, wherein the operation of said focus detecting means is an operation of moving a focusing lens to adjust focus.

10. A camera body according to claim 5, wherein the operation of said focus detecting means is an operation up to the detection of an in-focus state by a photo-sensor.

11. A camera according to claim 4, wherein the control of said diaphragm is to close said diaphragm from a full-open state so as to form an aperture value obtained by computation with inclusion of an output of said light metering sensor.

12. A camera body according to claim 8, wherein the control of said diaphragm is to close said diaphragm from a full-open state so as to form an aperture value obtained by computation with inclusion of an output of said light metering sensor.

13. A camera having focus detecting means, comprising:
   (a) an optical element for splitting an object light beam at a predetermined ratio to a finder optical system and a photographic system;
   (b) a second optical element for focus detection movable between a first state in which it lies within a photographic optical path in said photographic system and a second state in which it retracts from said photographic optical path, said second optical element conducting part of a photographing light beam to a focus detecting optical system; and
   (c) drive means, responsive to termination of an operation of said focus detecting means, for driving said second optical element from said first state to said second state regardless of whether or not a photographing operation is started.

14. A camera according to claim 13, wherein
   said optical element is a half-reflection mirror member arranged in said photographic optical path in a fixed relation, and
   said second optical element is a movable mirror element arranged axially behind said half-reflection mirror.

15. A camera according to claim 13, further comprising:
   a first switch for generating a start signal of an operation of said focus detecting means; and
   a second switch for generating a start signal of said photographing operation,
   wherein driving of said second optical element from said first state to said second state is, despite of the generation of said start signal from said second switch, carried out after the operation of said focus detecting means based on said start signal from said first switch.

16. A camera according to claim 13, further comprising:
a light metering sensor arranged in said finder optical system.

17. A camera according to claim 13, wherein said second optical element, when having moved to said second state, prevents light from entering said focus detecting optical system.

18. A camera body to which an interchangeable lens having a built-in diaphragm is detachably attached, comprising:
(a) focus detecting means;
(b) an optical element for splitting an object light beam at a predetermined ratio to a finder optical system and to a photographic system;
(c) a second optical element for focus detection movable between a first state in which it lies within a photographic optical path in said photographic system and a second state in which it retracts from said photographic optical path, said second optical element conducting part of a photographing light beam to a focus detecting optical system; and
(d) drive means, responsive to termination of an operation of said focus detecting means, for driving said second optical element from said first state to said second state regardless of whether or not a photographing operation is started.

19. A camera body according to claim 18, wherein said optical element is a half-reflection mirror member arranged in said photographic optical path in a fixed relation, and
said second optical element is a movable mirror element arranged axially behind said half-reflection mirror.

20. A camera body according to claim 18, further comprising:
a first switch for generating a start signal of an operation of said focus detecting means; and
a second switch for generating a start signal of said photographing operation,
wherein driving of said second optical element from said first state to said second state is, despite the generation of said start signal from said second switch, carried out after the operation of said focus detecting means based on said start signal from said first switch.

21. A camera body according to claim 18, wherein said second optical element, when having moved to said second state, prevents light from entering said focus detecting optical system.

* * * * *